(12) United States Patent
Musiienko et al.

(10) Patent No.: US 11,954,818 B2
(45) Date of Patent: Apr. 9, 2024

(54) METHOD AND DEVICE FOR PROCESSING 360-DEGREE IMAGE

(71) Applicant: SAMSUNG ELECTRONICS CO., LTD., Suwon-si (KR)

(72) Inventors: Andrii Musiienko, Kyiv Region (UA); Yevhenii Borodavka, Kyiv (UA); Andrii Tkach, Bila Tserkva (UA); Denys Zakutailo, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 664 days.

(21) Appl. No.: 17/052,057

(22) PCT Filed: Jun. 20, 2019

(86) PCT No.: PCT/KR2019/007444
§ 371 (c)(1),
(2) Date: Oct. 30, 2020

(87) PCT Pub. No.: WO2019/245299
PCT Pub. Date: Dec. 26, 2019

(65) Prior Publication Data
US 2021/0142442 A1    May 13, 2021

(30) Foreign Application Priority Data

Jun. 20, 2018 (KR) .......... 10-2018-0070821

(51) Int. Cl.
*G06T 3/00* (2006.01)
*G02B 27/01* (2006.01)
*H04N 13/111* (2018.01)

(52) U.S. Cl.
CPC ........ *G06T 3/0062* (2013.01); *G02B 27/0172* (2013.01); *H04N 13/111* (2018.05); *G02B 2027/014* (2013.01); *G06T 2200/04* (2013.01)

(58) Field of Classification Search
CPC ... G06T 3/0062; G06T 2200/04; G06T 5/006; G06T 2207/10012; G02B 27/0172;
(Continued)

(56) References Cited

U.S. PATENT DOCUMENTS 5,446,833 A    8/1995 Miller et al.
6,185,006 B1   2/2001 Yoshida
(Continued)

FOREIGN PATENT DOCUMENTS

CN    106991650 A    7/2017
EP      2568436 A1   3/2013
(Continued)

OTHER PUBLICATIONS

Communication dated Nov. 22, 2021 by the Korean Intellectual Property Office in Korean Patent Application No. 10-2018-0070821.
(Continued)

*Primary Examiner* — Ali Bayat
(74) *Attorney, Agent, or Firm* — Sughrue Mion, PLLC

(57) ABSTRACT

A method for processing a 360-degree image includes determining a processing order of each of a plurality of segments constituting a 360-degree image, based on positions of the segments and parameters of a camera by which the 360-degree image is captured, obtaining distortion correction information according to distortion in the 360-degree image predicted based on parameters of an optical device via which at least a partial region of the 360-degree image is projected, and processing data of the at least a partial region of the 360-degree image according to the determined processing order and the obtained distortion correction information.

13 Claims, 22 Drawing Sheets

(58) Field of Classification Search
CPC ........ G02B 2027/014; G02B 2027/011; G02B 2027/0116; G02B 27/017; H04N 13/111; H04N 13/122; H04N 13/261; H04N 13/344; H04N 13/117; H04N 13/128; H04N 13/172
USPC ....................................................... 382/276
See application file for complete search history.

(56) References Cited

U.S. PATENT DOCUMENTS

| | | | |
|---|---|---|---|
| 7,317,473 | B2 | 1/2008 | Chen et al. |
| 8,217,956 | B1 | 7/2012 | Jin |
| 8,538,134 | B2 | 9/2013 | Kim et al. |
| 9,363,569 | B1* | 6/2016 | van Hoff ............... H04N 13/271 |
| 9,600,929 | B1 | 3/2017 | Young et al. |
| 10,033,982 | B2 | 7/2018 | Zhao et al. |
| 10,992,918 | B2 | 4/2021 | Yip et al. |
| 11,061,208 | B2 | 7/2021 | Trubko et al. |
| 2006/0209183 | A1 | 9/2006 | Mashitani et al. |
| 2015/0172544 | A1 | 6/2015 | Deng et al. |
| 2016/0012855 | A1 | 1/2016 | Krishnan |
| 2016/0077315 | A1 | 3/2016 | Trubko et al. |
| 2016/0191815 | A1* | 6/2016 | Annau ................ G06Q 30/0263 348/38 |
| 2016/0353089 | A1 | 12/2016 | Gallup et al. |
| 2017/0076429 | A1 | 3/2017 | Russell |
| 2017/0213324 | A1 | 7/2017 | Wang et al. |
| 2017/0330365 | A1* | 11/2017 | Adamov ................. H04L 67/10 |
| 2017/0372481 | A1 | 12/2017 | Onuki |
| 2018/0053285 | A1 | 2/2018 | Jones et al. |
| 2018/0181358 | A1* | 6/2018 | Asai ...................... G06F 3/1423 |
| 2018/0182065 | A1* | 6/2018 | Yoshida ................ G06T 3/0062 |
| 2018/0279006 | A1 | 9/2018 | Cole et al. |
| 2019/0289206 | A1* | 9/2019 | Kawaguchi ........... G06T 3/4038 |

FOREIGN PATENT DOCUMENTS

| | | |
|---|---|---|
| JP | 2004-64710 A | 2/2004 |
| JP | 2009-218851 A | 9/2009 |
| JP | 4324435 B2 | 9/2009 |
| JP | 2014-123908 A | 7/2014 |
| JP | 2015-519802 A | 7/2015 |
| KR | 10-1390810 B1 | 5/2014 |
| KR | 10-2017-0015938 A | 2/2017 |
| KR | 10-2017-0067767 A | 6/2017 |
| KR | 10-2017-0095035 A | 8/2017 |
| WO | 2014043814 A1 | 3/2014 |
| WO | 2015027105 A1 | 2/2015 |
| WO | 2018009746 A1 | 1/2018 |

OTHER PUBLICATIONS

Communication dated Mar. 12, 2021 issued by the European Patent Office in European Application No. 19823527.7.
International Search Report and Written Opinion (PCT/ISA/210 and PCT/ISA/237), dated Sep. 26, 2019 by International Searching Authority in International Application No. PCT/KR2019/007444.
Communication dated Mar. 23, 2022 by the China National Intellectual Property Administration in Chinese Patent Application No. 201980041461.4.
Communication dated Oct. 12, 2023, issued by European Patent Office in European Patent Application No. 19823527.7.
Communication dated Jan. 18, 2024, issued by the European Patent Office in European Application No. 19823527.7.

* cited by examiner

CAMERA PITCH < π/4

METHOD AND DEVICE FOR PROCESSING 360-DEGREE IMAGE

TECHNICAL FIELD

The present disclosure relates to a method for processing a 360-degree image, an apparatus for processing a 360-degree image, and a computer program for performing the method for processing a 360-degree image.

BACKGROUND ART

Along with the development of image processing technologies, research has been actively conducted on methods of providing a 360-degree image as one of the technologies for providing a more realistic image to a user. In order to provide a 360-degree image, a technique of processing image data so that a region of a 360-degree image corresponding to the gaze of a user may be projected on both eyes of the user in real time is required.

In the case of projecting a 360-degree image, since data to be processed is vast due to (non-linear) characteristics of an optical system for projecting a 360-degree image, it may take a lot of time to process the image. Accordingly, a high-performance GPU or a plurality of processors may be required to process a 360-degree image in real time.

Accordingly, it is necessary to develop a technology capable of more efficiently performing image processing in order to reduce time required for processing a 360-degree image and costs of hardware.

DESCRIPTION OF EMBODIMENTS

Technical Problem

According to an embodiment of the present disclosure, provided is a method and apparatus for processing a 360-degree image, which may minimize the time required for processing a 360-degree image by improving the efficiency in the processing of the 360-degree image. According to another embodiment of the present disclosure, provided is a method and apparatus for processing a 360-degree image, which may minimize data used for processing a 360-degree image and thus can perform image processing even in a single hardware chip.

Technical Solution to Problem

The present disclosure relates to a method for processing a 360-degree image which determines a processing order of each of a plurality of segments constituting a 360-degree image, based on positions of the segments and parameters of a camera by which the 360-degree image is captured, obtains distortion correction information according to a distortion in the 360-degree image predicted based on parameters of an optical device via which at least a partial region of the 360-degree image is projected, and processes data of the at least a partial region of the 360-degree image according to the determined processing order and the obtained distortion correction information.

BEST MODE

Figure 1:
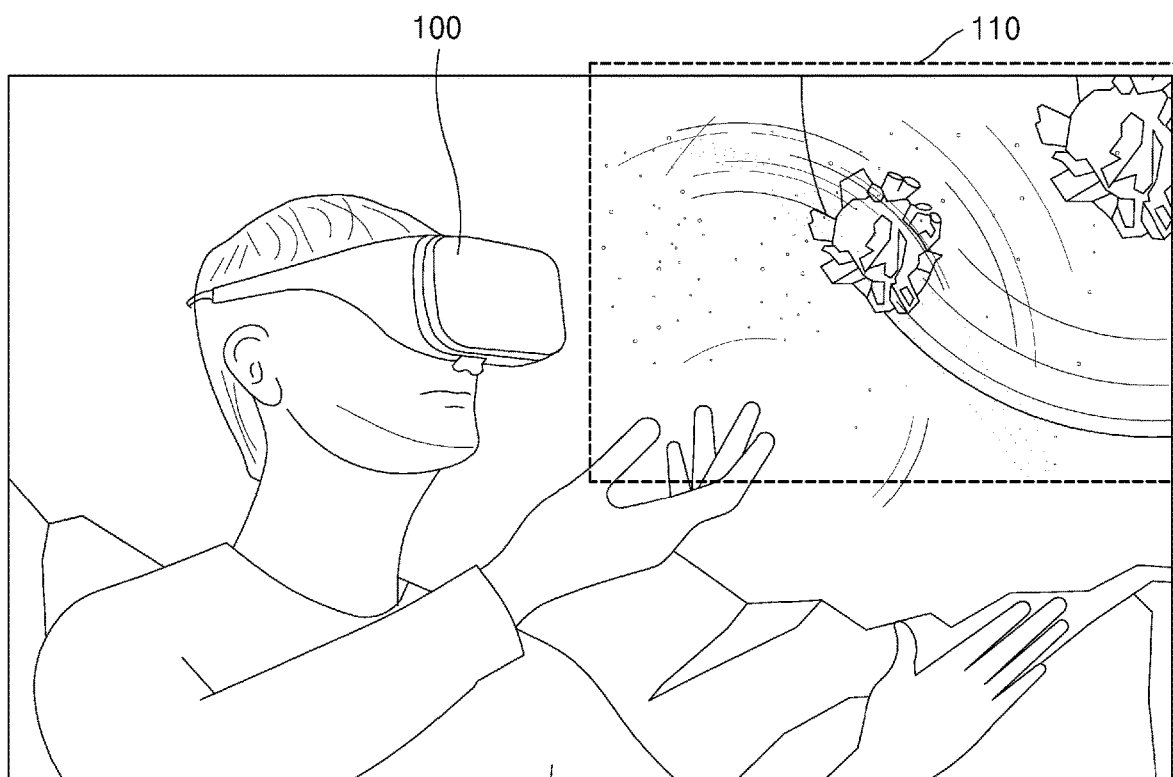
FIG. 1 is a conceptual diagram for explaining a method for processing a 360-degree image according to an embodiment.

According to an embodiment, a method for processing a 360-degree image may include: determining a processing order of each of a plurality of segments constituting a 360-degree image, based on positions of the segments and parameters of a camera by which the 360-degree image is captured; obtaining distortion correction information according to a distortion in the 360-degree image predicted based on parameters of an optical device via which at least a partial region of the 360-degree image is projected; and processing data of the at least a partial region of the 360-degree image according to the determined processing order and the obtained distortion correction information.

In the method according to an embodiment, the determining of the processing order may include dividing the 360-degree image into a plurality of segments.

In the method according to an embodiment, the dividing may include: dividing the 360-degree image into quadrants; and dividing each of the quadrants into a plurality of segments, and the processing order may be determined based on positions of the segments on the quadrants and a pitch value of the camera.

In the method according to an embodiment, the determining of the processing order may include determining the processing order to allow a pixel in a boundary region to be processed in preference to other pixels, the pixel being from among pixels included in each of the plurality of segments.

In the method according to an embodiment, the obtaining of the distortion correction information may include predicting at least one of barrel distortion and pincushion distortion based on the parameters of the optical device, and the distortion correction information may include pixel correction information capable of offsetting at least one of the barrel distortion and the pincushion distortion.

The method according to an embodiment may further include determining a coordinate transformation value of a pixel included in at least a partial region of the 360-degree image according to predefined transformation information of left-eye and right-eye images.

In the method according to an embodiment, the obtaining of the distortion correction information may include predicting chromatic aberration of a pixel included in the 360-degree image based on the parameters of the optical device, and the distortion correction information may include pixel correction information for each color capable of offsetting the predicted chromatic aberration.

In the method according to an embodiment, the processing of the data may include reading data of at least a partial region of an image prestored in a memory according to the determined processing order.

The method according to an embodiment may further include determining coordinates, on a sphere, of a pixel included in the at least a partial region of the 360-degree image, based on the parameters of the camera, and the processing of the data may process the determined coordinates according to the determined processing order and the obtained distortion information.

An apparatus for processing a 360-degree image according to an embodiment may include: a memory storing one or more instructions; and a processor configured to execute the one or more instructions stored in the memory, and the processor may be configured to, by executing the one or more instructions, determine a processing order of each of a plurality of segments constituting a 360-degree image, based on positions of the segments and parameters of a camera by which the 360-degree image is captured, obtain distortion correction information based on a distortion in the 360-degree image predicted from parameters of an optical device via which at least a partial region of the 360-degree image is projected, and process data of the at least a partial region of the 360-degree image according to the determined processing order and the obtained distortion correction information.

MODE OF DISCLOSURE

The terms used in the present specification will be briefly described, and the present disclosure will be described in detail.

The terms used in the present disclosure are selected from currently widely used general terms in consideration of functions of the present disclosure, but may vary according to the intentions or practices of those of ordinary skill in the art or the advent of new technology. Additionally, in certain cases, there may be terms that an applicant may arbitrarily select, and in this case, their meanings are described in the corresponding description. Thus, the definitions of the terms used in the present disclosure should be determined based on the whole content of present disclosure together with the intended meanings of the terms rather than their simple names or meanings.

Although the terms including an ordinal number such as first, second, and so forth, can be used for describing various elements, the elements are not limited to the terms. The terms are used only to distinguish one element from another element. For example, without departing from the scope of the present disclosure, a first element may be named a second element, and similarly, the second element also may be named the first element. The term "and/or" includes a combination of a plurality of associated items or any one of a plurality of associated items.

Throughout the present specification, when a part is referred to as "including" or "comprising" any element, this means that other elements may be further included, rather than excluding other elements, unless described otherwise. In addition, the term "unit" used in the present specification means a hardware element such as software, a field programmable gate array (FPGA), or an application specific integrated circuit (ASIC), and the "unit" performs a certain function. However, the "unit" is not limited to software or hardware. The "unit" may be configured in an addressable storage medium or may be configured to operate one or more processors. Therefore, for example, the "unit" may include elements such as software elements, object-oriented software elements, class elements and task elements, and may include processes, functions, attributes, procedures, subroutines, segments of program code, drivers, firmware, microcode, circuits, data, databases, data structures, tables, arrays and variables. The elements and functions provided within "units" may be combined into a smaller number of elements and "units" or may be further separated into additional elements and "units".

Hereinafter, embodiments of the present disclosure will be described in detail with reference to the accompanying drawings for one of ordinary skill in the art to be able to perform the embodiments without any difficulty. However, the present disclosure may be implemented in various different forms and is not limited to the embodiments described herein. In the drawings, parts unrelated to the description are omitted to clearly describe the present disclosure, and like reference numerals designate like parts throughout the present specification.

FIG. 1 is a conceptual diagram for explaining a method for processing a 360-degree image according to an embodiment.

Referring to FIG. 1, an apparatus 100 for processing a 360-degree image (hereinafter, referred to as an image processing apparatus) may project images on both eyes of a user to recognize a portion 110 of a 360-degree image corresponding to a gaze of the user, to allow the user to experience virtual reality through the 360-degree image.

Meanwhile, in processing a 360-degree image, as the amount of data to be processed is vast, a high-performance graphic processing unit (GPU) is necessarily required. In addition, as a processing response time increases due to the vast amount of data, it is difficult to respond to a user's gaze in real time in processing a 360-degree image.

The image processing apparatus 100 according to the present disclosure may provide a method for more efficiently processing non-linear properties existing in a 360-degree image in order to increase the speed at which a 360-degree image is processed.

For example, the image processing apparatus 100 may divide a 360-degree image into a plurality of regions according to a non-linear direction, and may determine a processing order for each of the divided regions. Here, the processing order may be determined according to a position of each region in the 360-degree image and parameters of a capturing device such as a camera by which the 360-degree image is captured.

According to another embodiment, the image processing apparatus 100 may determine distortion correction information for each pixel to correct geometric aberration and chromatic aberration that occur in projecting at least a partial region of the 360-degree image. For example, the image processing apparatus 100 may preapply a value capable of offsetting a distortion that occurs in the projection, to each pixel included in the image to be projected.

According to another embodiment, in the case of projecting at least a partial region of a 360-degree image onto each of both eyes of a user, the image processing apparatus 100 may separately generate images to be projected onto the left eye and the right eye to allow the user to perceive a stereoscopic feeling. The image processing apparatus 100 may determine a stereoscopic delta value that is a pixel transformation value required for generating a left-eye image and a right-eye image, in consideration of a vision perception characteristic of the left and right eyes of a human being.

The image processing apparatus 100 according to an embodiment may load segment data or pixel data from a 360-degree image according to the determined processing order, and process the image by applying distortion correction information, the stereoscopic delta value, and so forth to the loaded data, thereby reducing time, memory, and so forth, required for image processing.

In the present disclosure, the 360-degree image may include at least one of a fisheye image, a spherical panoramic image, and a cylindrical panoramic image. However, this is merely an example, and the 360-degree image is not limited to the above-described examples.

Figure 2:
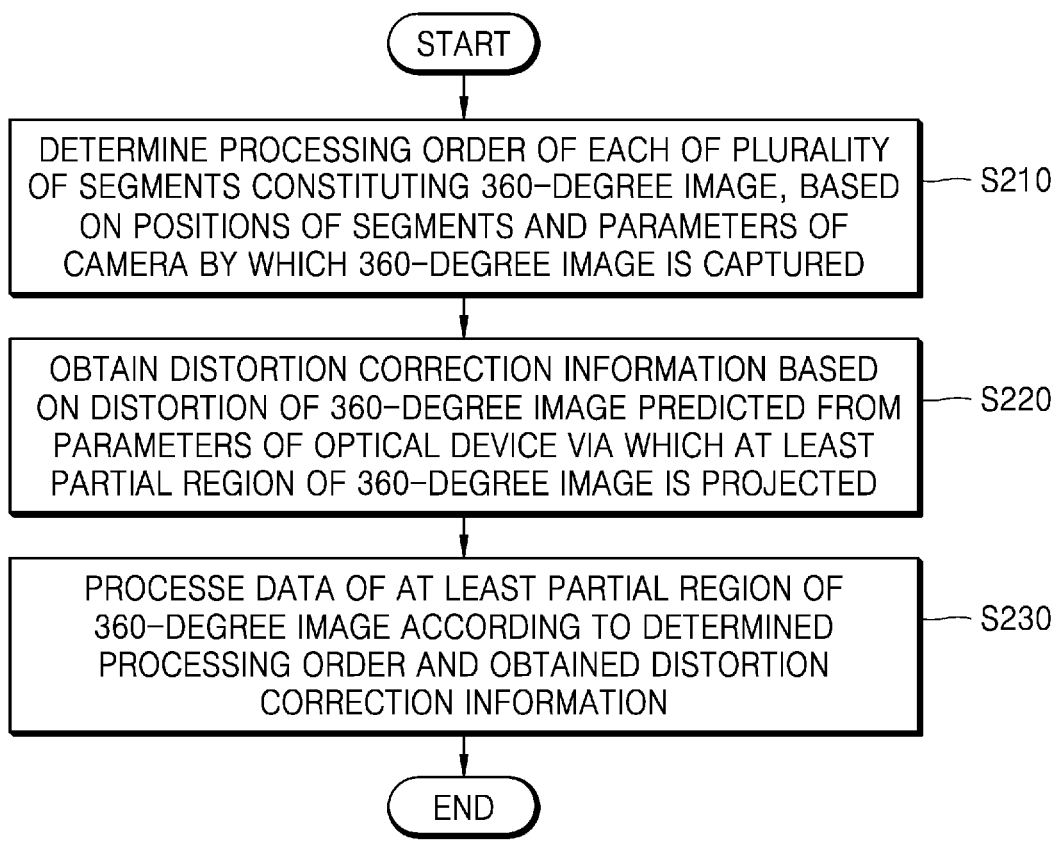
FIG. 2 is a flowchart for explaining a method for processing a 360-degree image according to an embodiment.

FIG. 2 is a flowchart for explaining a method for processing a 360-degree image according to an embodiment.

In operation S210, an image processing apparatus may determine a processing order of each of a plurality of segments constituting a 360-degree image, based on positions of the segments and parameters of a camera by which the 360-degree image is captured.

An image processing apparatus according to an embodiment may perform segmentation that divides a screen into a plurality of segments having a predefined size. When performing the segmentation, a segment processing order may be determined based on at least one of a position of a segment and a position of the camera according to the nonlinearity of projection of a 360-degree image.

In addition, the image processing apparatus may determine a bypassing order with respect to a plurality of pixels included in a segment. Here, the image processing apparatus may preferentially load a pixel located at a boundary point of a segment in order to minimize latency. Then the image processing apparatus may bypass the pixels from a set top vertex along a predefined direction.

In operation S220, the image processing apparatus may obtain distortion correction information according to a distortion in the 360-degree image predicted based on parameters of an optical device from which at least a partial region of the 360-degree image is output.

The image processing apparatus according to an embodiment may predict a geometric distortion that occurs when projecting an image, based on parameters of a lens included in an optical system via which at least a partial region of a 360-degree image is projected. The image processing apparatus may pre-distort each of pixels included in at least a partial region of the 360-degree image in an opposite direction in order to offset the predicted geometric distortion.

The image processing apparatus according to another embodiment may predict chromatic aberration with respect to RGB components each constituting pixels included in at least a partial region of the 360-degree image. The image processing apparatus may offset the predicted chromatic aberration, and may pre-distort components for each color such that an image of the RGB components may be formed on a single focus.

Meanwhile, the image processing apparatus may further determine a coordinate transformation value of a pixel included in at least a partial region of the 360-degree image according to transformation information of left-eye and right-eye images predefined based on a vision perception characteristic. This will be described in more detail with reference to FIGS. 9A and 9B.

In operation S230, the image processing apparatus may process data of at least a partial region of the 360-degree image according to the determined processing order and the obtained distortion correction information.

The image processing apparatus according to an embodiment may load data of segments included in at least a partial region of the 360-degree image and data of pixels included in each segment, according to the determined processing order. In addition, the image processing apparatus may transform the loaded data based on the distortion correction information.

FIGS. 3A to 3E are diagrams for explaining a method for determining a processing order by dividing, by an image processing apparatus according to an embodiment, a 360-degree image into a plurality of segments.

Figure 3A:
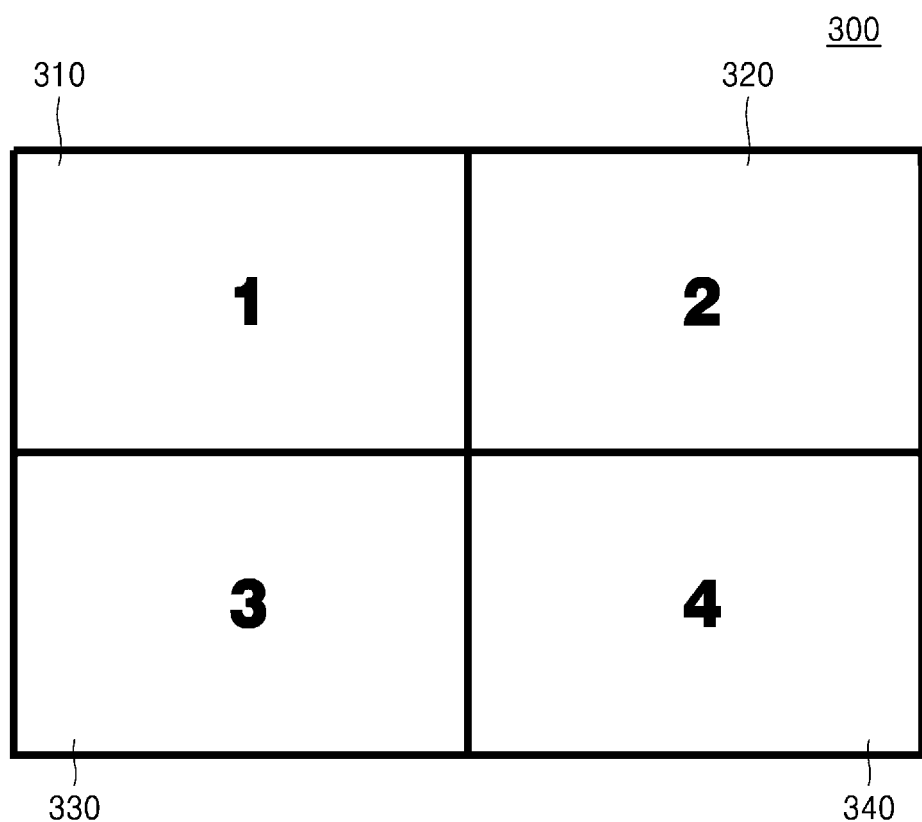
FIGS. 3A to 3E are diagrams for explaining a method by which an image processing apparatus according to an embodiment determines a processing order by dividing a 360-degree image into a plurality of segments.

Referring to FIG. 3A, the image processing apparatus may divide a 360-degree image 300 into quadrants according to a central axis of a camera that is a device by which the 360-degree image 300 is captured.

Figure 3B:
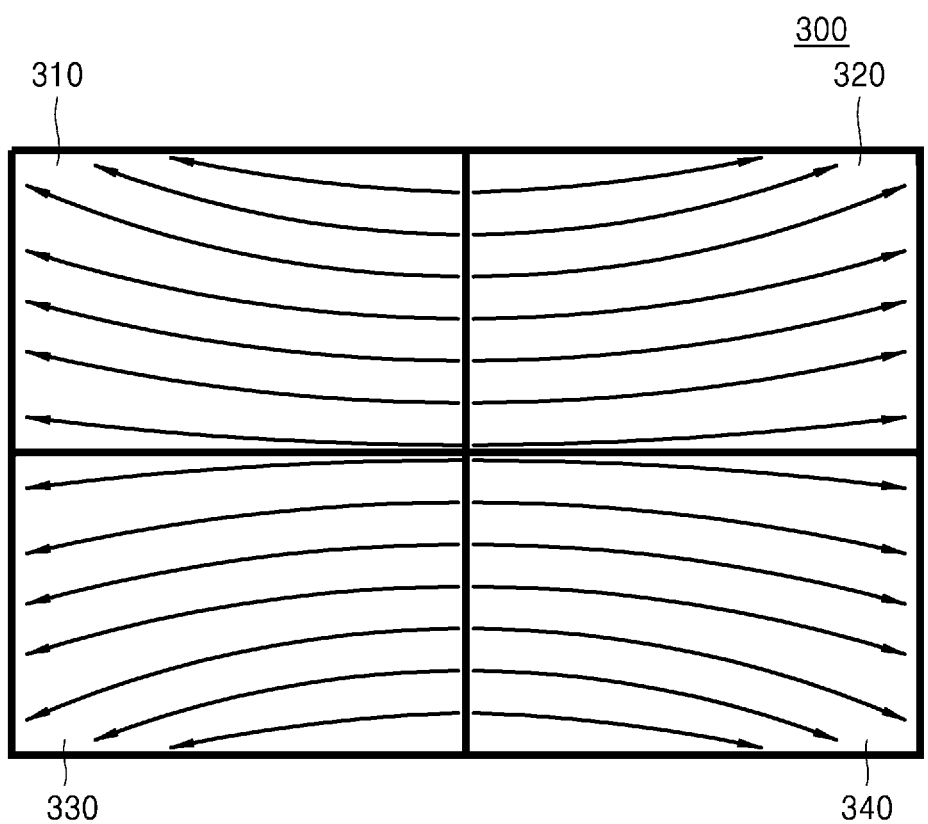

Referring to FIG. 3B, it may be confirmed that each of the quadrants 310, 320, 330, and 340 divided from the 360-degree image 300 by the image processing apparatus has non-linearity in different directions. In the case of projecting each of the quadrants 310, 320, 330, and 340 of the 360-degree image 300 onto a sphere, their shapes and sizes may be distorted.

In order to prevent such distortion, segmentation may be performed on each of the quadrants 310, 320, 330, and 340 of the 360-degree image 300. For example, the image processing apparatus may perform segmentation that divides each of the four quadrants 310, 320, 330, and 340 of the 360-degree image 300 into a plurality of segments of a 7×7 configuration.

In the case of projecting the 360-degree image 300, a plurality of segments constituting the 360-degree image 300 may overlap each other. Accordingly, in order to maximize the use of a pre-loaded segment, and to reduce the number of times of requesting and reading a segment, the image processing apparatus according to an embodiment may determine an order in which a plurality of segments are bypassed after performing segmentation. For example, the image processing apparatus may determine an order in which a plurality of segments are bypassed based on a position of a segment and parameters of a camera by which the 360-degree image 300 is captured. This will be described with reference to FIGS. 3C to 3E.

Figure 3C:
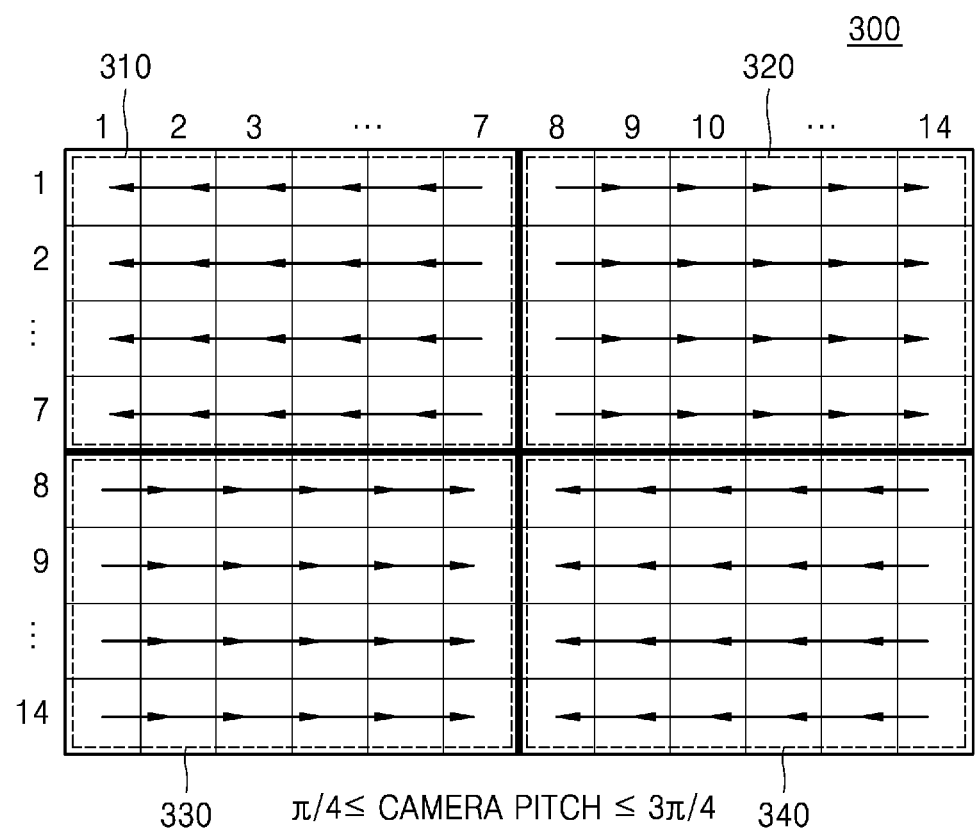

Referring to FIG. 3C, a bypass order of a plurality of segments determined by the image processing apparatus, in the case where a pitch value of a camera is greater than or equal to π/4 and is within a range of 3π/4, is illustrated. In the present embodiment, the image processing apparatus may determine an order in which a plurality of segments included in the first quadrant 310 and the fourth quadrant 340 are bypassed, to be right-to-left. In addition, the image processing apparatus may determine an order in which a plurality of segments included in the second quadrant 320 and the third quadrant 330 are bypassed, to be left-to-right.

Figure 3D:
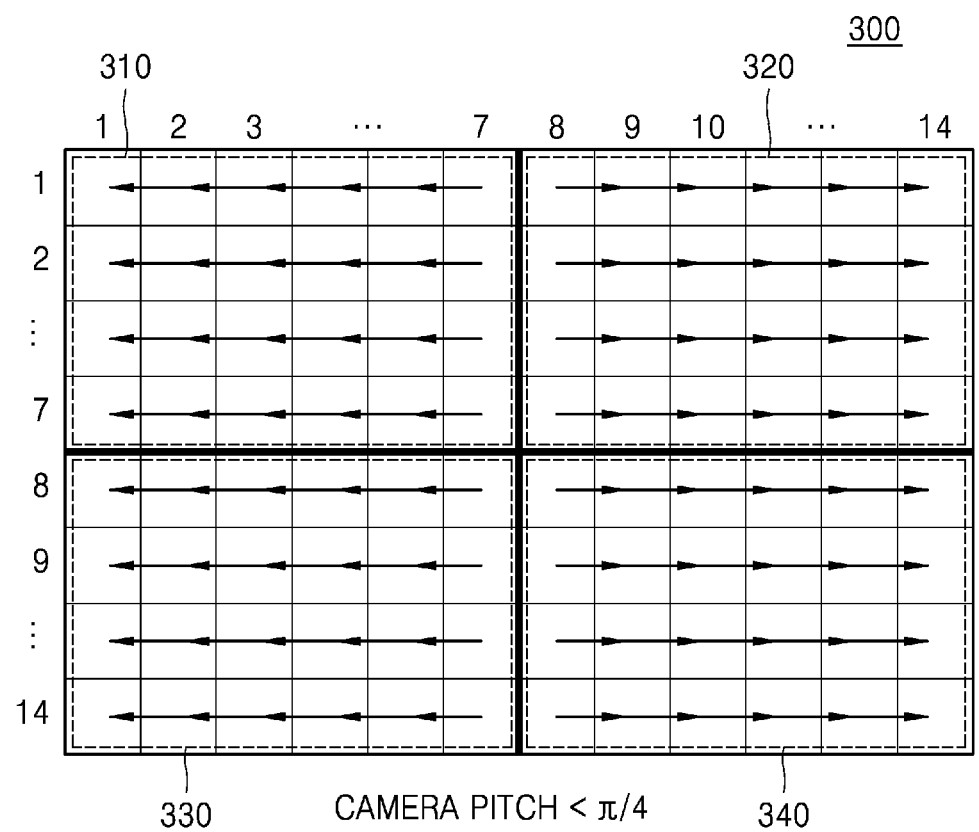

Referring to FIG. 3D, a bypass order of a plurality of segments, in the case where the pitch value of the camera is less than π/4, is illustrated. In the present embodiment, the image processing apparatus may determine an order in which a plurality of segments included in the first quadrant 310 and the third quadrant 330 are bypassed, to be right-to-left. In addition, the image processing apparatus may determine an order in which a plurality of segments included in the second quadrant 320 and the fourth quadrant 340 are bypassed, to be left-to-right.

Figure 3E:
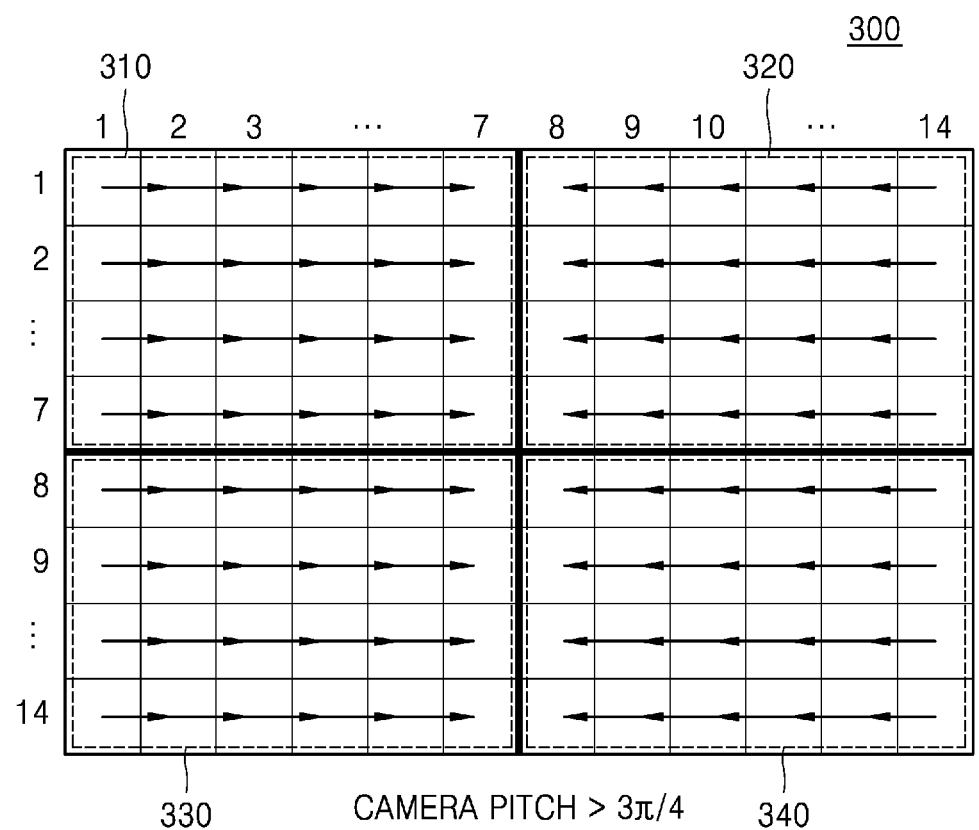

Referring to FIG. 3E, a bypass order of a plurality of segments, in the case where the pitch value of the camera is greater than 3π/4, is illustrated. In the present embodiment, the image processing apparatus may determine an order in which a plurality of segments included in the first quadrant 310 and the third quadrant 330 are bypassed, to be left-to-right. In addition, the image processing apparatus may determine an order in which a plurality of segments included in the second quadrant 320 and the fourth quadrant 340 are bypassed, to be right-to-left.

Figure 4:
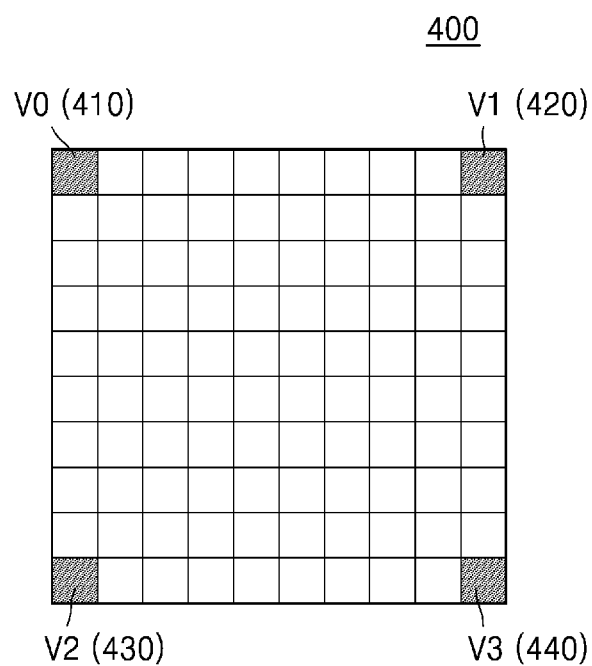
FIG. 4 is a diagram for explaining a top vertex defined by an image processing apparatus according to an embodiment to determine an order of processing of pixels in a segment.

FIG. 4 is a diagram for explaining a top vertex defined by an image processing apparatus according to an embodiment to determine an order of processing of pixels in a segment.

According to an embodiment, an order in which pixels are processed in a segment may be based on the quadrants and the pitch of the camera described with reference to FIG. 3. Pixel processing in each segment may be initiated at a top vertex. Referring to FIG. 4, pixel processing may be initiated at any one of top vertices V0 410, V1 420, V2 430, and V3 440 in a segment 400.

Figure 5:
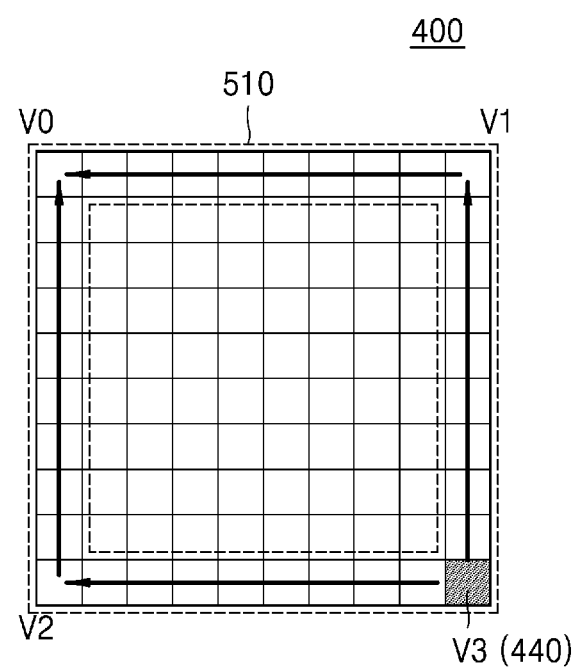
FIG. 5 is a diagram for explaining a method by which an image processing apparatus according to an embodiment processes pixels in a segment.

FIG. 5 is a diagram for explaining a method for processing, by an image processing apparatus according to an embodiment, pixels in a segment.

Referring to FIG. 5, the image processing apparatus according to an embodiment may preferentially process a boundary region 510 of the segment 400 first in order to reduce latency. For example, in the case where the top vertex V3 440 is determined as a top vertex at which pixel processing is initiated, the image processing apparatus may preferentially process the boundary region 510 of the segment 400 based on the top vertex V3 440 as a starting point. The image processing apparatus may pre-load data required for pixel processing of the segment 400 by preferentially processing the boundary region 510 of the segment 400.

Figure 6A:
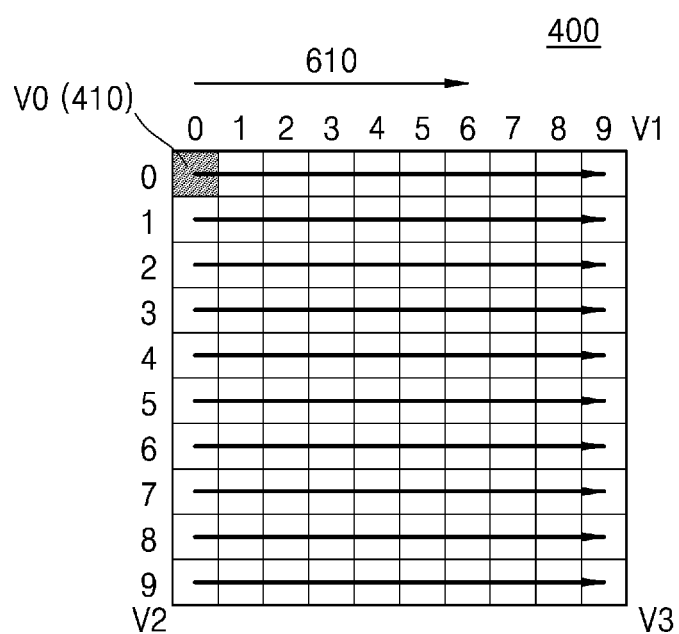
FIGS. 6A and 6B are diagrams for explaining a method by which an image processing apparatus according to an embodiment determines an order of processing of pixels in a segment.
Figure 6B:
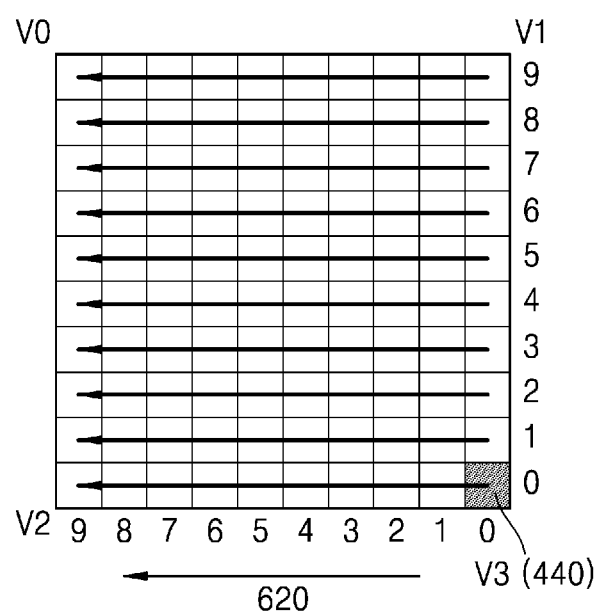

FIGS. 6A and 6B are diagrams for explaining a method for determining, by an image processing apparatus according to an embodiment, an order of processing of pixels in the segment 400.

Referring to FIG. 6A, the image processing apparatus may determine the top vertex V0 410 as a top vertex at which pixel processing is initiated in the segment 400. The image processing apparatus may determine a top vertex at which pixel processing is initiated based on at least one of the bypass order of the segment and the pitch of the camera, but this is only an example, and the top vertex at the pixel processing is initiated may be arbitrarily determined based other aspects. The image processing apparatus may determine a processing order of 10×10 pixels included in the segment 400 to be left-to-right based on the top vertex V0 410 as a starting point.

Referring to FIG. 6B, according to another embodiment, the image processing apparatus may determine the top vertex V3 440 as a top vertex at which pixel processing is initiated in the segment 400. The image processing apparatus may determine the processing order of the 10×10 pixels included in the segment 400 to be right-to-left based on the top vertex V3 440 as a starting point.

Figure 7:
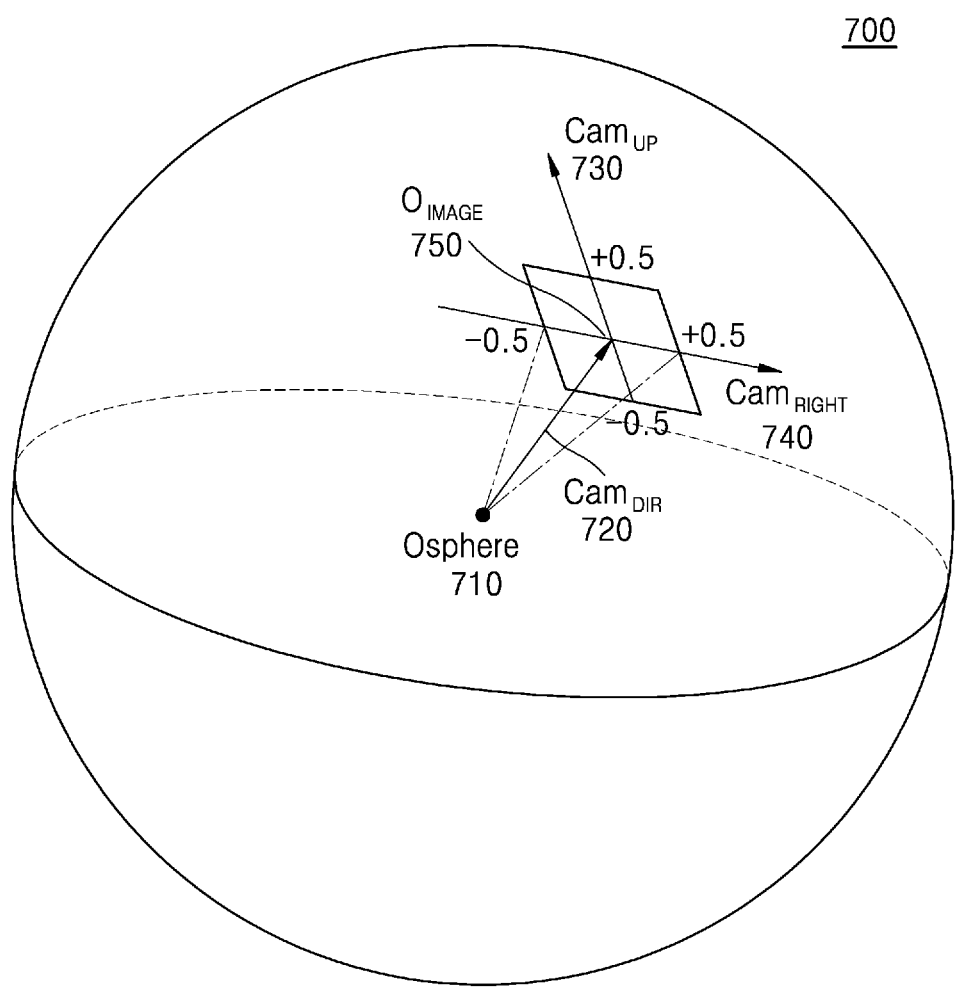
FIG. 7 a diagram for explaining a method by which an image processing apparatus according to an embodiment determines an image vector based on parameters of a camera by which a 360-degree image is captured.

FIG. 7 a diagram for explaining a method for determining, by an image processing apparatus according to an embodiment, an image vector based on parameters of a camera by which a 360-degree image is captured.

Referring to FIG. 7, assuming a sphere 700 onto which a 360-degree image is projected, the image processing apparatus may determine an image vector that is a vector from a center 710 of the sphere onto which the 360-degree image is projected, to a center 750 of an image, based on position information of the camera. Hereinafter, a method for determining an image vector will be described in more detail.

The image processing apparatus may define a position of a camera as yaw, pitch, and roll values. In the present embodiment, it is assumed that the yaw, pitch, and roll values of the camera are α,β,γ, respectively.

The image processing apparatus may determine (X, Y, Z) coordinates of $\overrightarrow{Cam_{DIR}}$ 720 which is a camera direction vector corresponding to a direction perpendicular to a plane of the image from the center 710 of the sphere based on the position of the camera, according to the following Equation 1.

$X = \sin \beta \cdot \cos \gamma$ $Y = \sin \beta \cdot \sin \gamma$ $Z = \cos \beta$      [Equation 1]

In addition, the image processing apparatus may determine (X, Y, Z) coordinates of $\overrightarrow{Cam_{UP}}$ 730 which is an upward direction vector of the camera starting from the center 750 of the plane of the image, according to the following Equation 2.

$X = (\cos \alpha \cdot \cos \beta \cdot \cos \gamma - \sin \alpha \cdot \sin \gamma) \cdot \gamma_{up}$ $Y = (\cos \alpha \cdot \cos \beta \cdot \sin \gamma + \sin \alpha \cdot \cos \gamma) \cdot \gamma_{up}$ $Z = -\cos \alpha \cdot \sin \beta \cdot \gamma_{up}$      [Equation 2]

In Equation 2, $Y_{up}$ denotes a vertical coefficient depending on a field of view (FOV) of the camera.

The image processing apparatus may determine (X, Y, Z) coordinates of $\overrightarrow{Cam_{RIGH}}$ 740 which is a right direction vector of the camera starting from the center 750 of the plane of the image, according to the following Equation 3.

$X = (-\sin \alpha \cdot \cos \beta \cdot \cos \gamma - \cos \alpha \cdot \sin \gamma) \cdot \gamma_r$ $Y = (-\sin \alpha \cdot \cos \beta \cdot \sin \gamma + \cos \alpha \cdot \cos \gamma) \cdot \gamma_r$ $Z = \sin \alpha \cdot \sin \beta \cdot \gamma_r$      [Equation 3]

In Equation 3, $\gamma_r$ denotes a horizontal coefficient depending on the field of view (FOV) of the camera.

The image processing apparatus may determine $\overrightarrow{img_{ORIG}}$ which is an image vector from the center 710 of the sphere toward the center 750 of the image, base on values of $\overrightarrow{Cam_{DIR}}$ 720, $\overrightarrow{Cam_{UP}}$ 730, and $\overrightarrow{Cam_{RIGH}}$ 740, according to the following Equation 4.

$\overrightarrow{img_{ORIG}} = \overrightarrow{Cam_{DIR}} - \overrightarrow{Cam_{RIGH}} \cdot 035 - \overrightarrow{Cam_{up}} \cdot 0.5$      [Equation 4]

Figure 8:
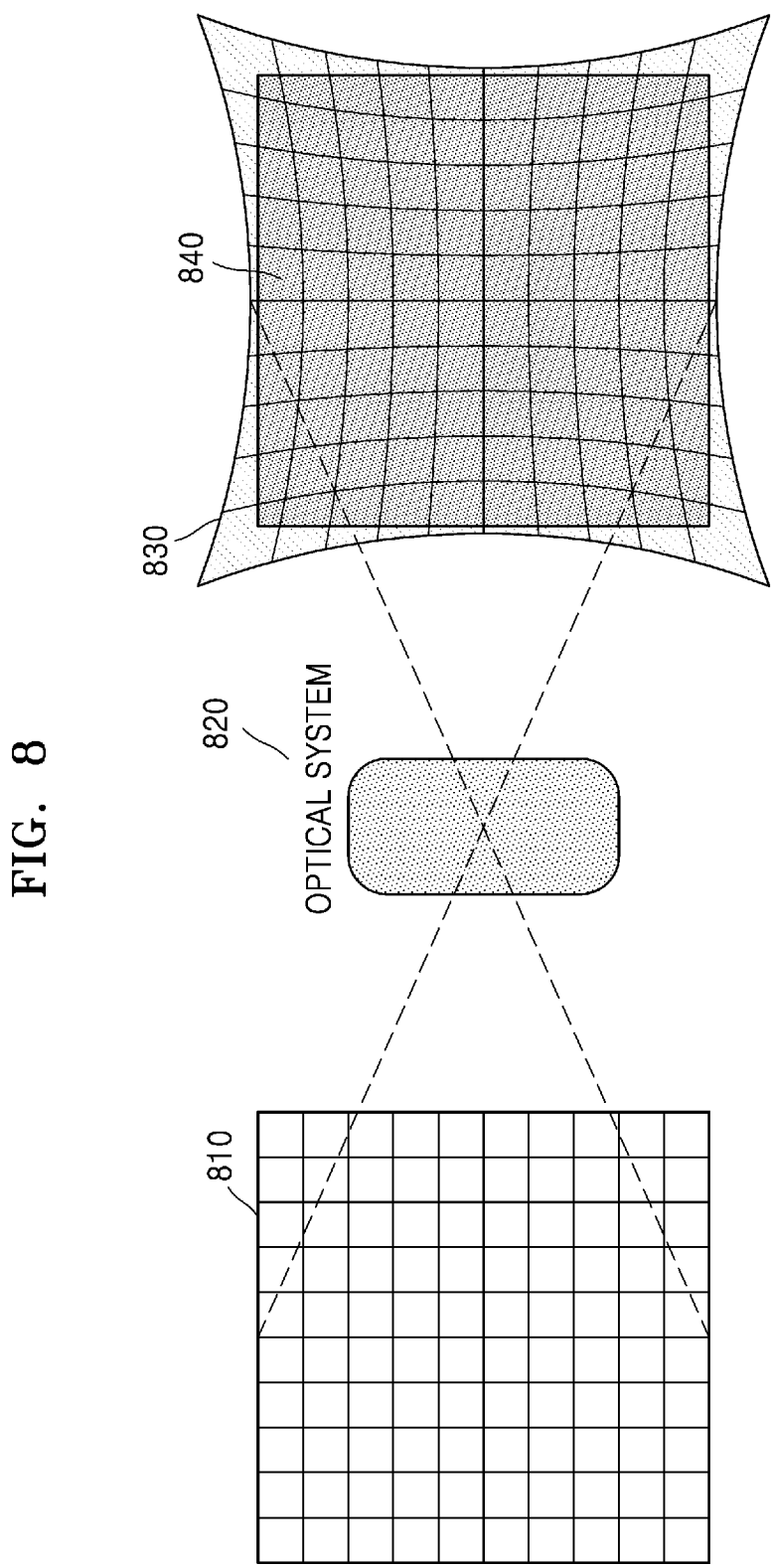
FIG. 8 is a diagram for explaining a method by which an image processing apparatus according to an embodiment corrects geometric aberration for 360-degree image processing.

FIG. 8 is a diagram for explaining a method for correcting, by an image processing apparatus according to an embodiment, geometric aberration for 360-degree image processing.

Referring to FIG. 8, an optical system 820 used for projecting at least a partial region 810 of a 360-degree image onto both eyes of a user may include a pair of lenses. Meanwhile, geometric aberration such as a barrel distortion or a pincushion distortion may occur due to the pair of lenses constituting the optical system.

The image processing apparatus may correct the geometric aberration based on an optical invariant, such as Lagrange invariant or Smith-Helmholtz invariant.

For example, the image processing apparatus may obtain an image 830 in which geometric aberration occurs as the at least a partial region 810 of the 360-degree image is projected via the optical system 820. The image processing apparatus may pre-correct a value of each of a plurality of pixels included in the at least a partial region 810 of the 360-degree image based on an optical backpropagation approach. That is, the image processing apparatus may pre-distort the pixels in the direction opposite to a direction in which a distortion occurs.

In the case where a pre-distorted image is projected via the optical system 820, the distortion generated by the optical system 820 may be offset, and thus, a projected image 840 in which geometric aberration is not generated may be obtained.

Figure 9A:
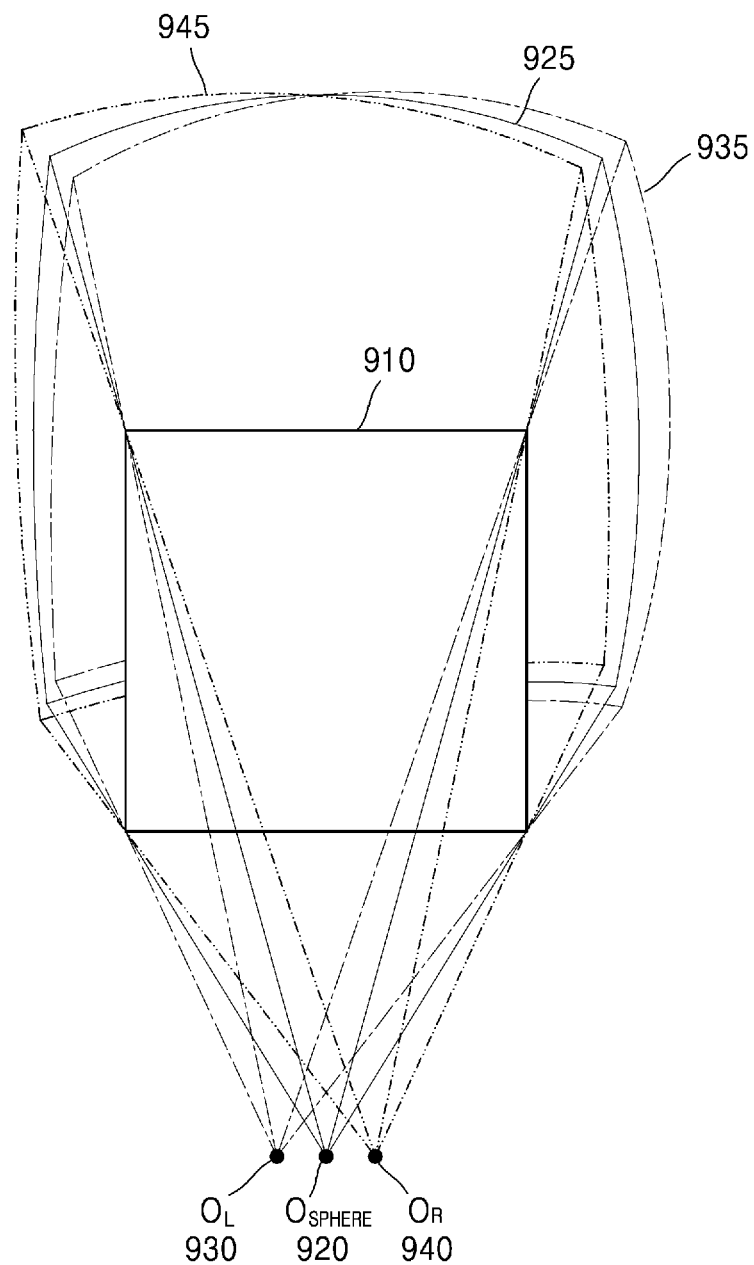
FIGS. 9A and 9B are diagrams for explaining a method by which an image processing apparatus according to an embodiment processes a 360-degree image to obtain a stereoscopic effect.
Figure 9B:
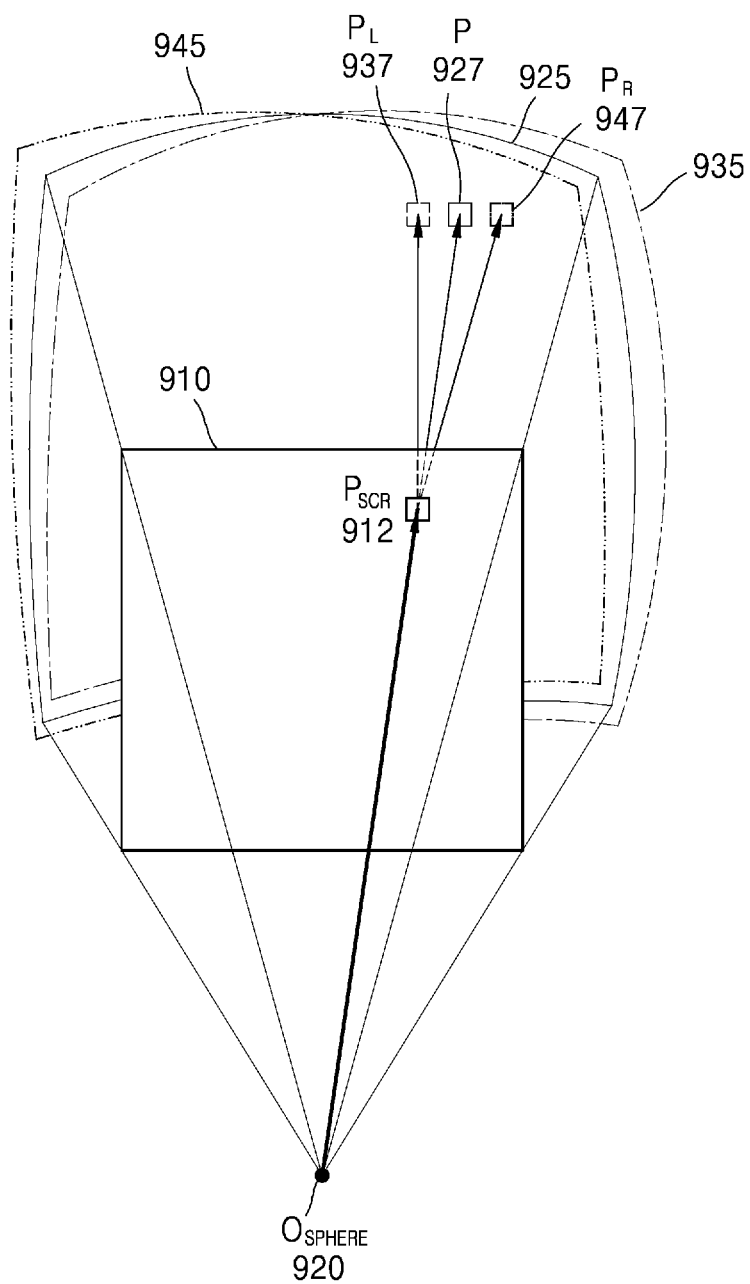

FIGS. 9A and 9B are diagrams for explaining a method for processing, by an image processing apparatus according to an embodiment, a 360-degree image to obtain a stereoscopic effect.

The image processing apparatus may allow a user to perceive a stereoscopic feeling by projecting at least a partial region 910 of the 360-degree image onto both eyes of the user. In this case, images projected onto both eyes of the user may be different from each other such that the user may perceive a stereoscopic feeling.

For example, referring to FIG. 9A, in the case where the at least a partial region 910 of the 360-degree image is projected onto both eyes of the user respectively, a range 935 in which the at least a partial region of the 360-degree image is projected based on a center 930 of the left eye may be different from a range 945 in which the at least a partial region of the 360-degree image is projected based on a center 940 of the right eye. Accordingly, the image processing apparatus may obtain a stereoscopic effect by generating the images to be projected onto the left eye and the right eye respectively, to be different from each other.

Referring to FIG. 9B, in order to obtain a stereoscopic effect, the image processing apparatus according to an embodiment may determine a point of each of left and right eyes onto which $P_{SCR}$ 912 which is a pixel included in a target image 910 is projected. For example, in the case where a point onto which the pixel P SCR 912 included in the target image 910 is projected is P 927 based on the center of the sphere, the image processing apparatus may generate a left-eye image and a right-eye image to which binocular disparity is applied, by processing a pixel corresponding to $P_{SCR}$ 912 in the image to be projected to the left eye to be projected onto $P_L$ 937, and processing a pixel corresponding to $P_{SCR}$ 912 in the image to be projected to the right eye to be projected onto $P_R$ 947.

Meanwhile, the image processing apparatus may more efficiently generate the left-eye image and the right-eye image to which the binocular disparity is applied based on a lookup table pre-generated based on characteristics of the left eye and the right eye.

Figure 10:
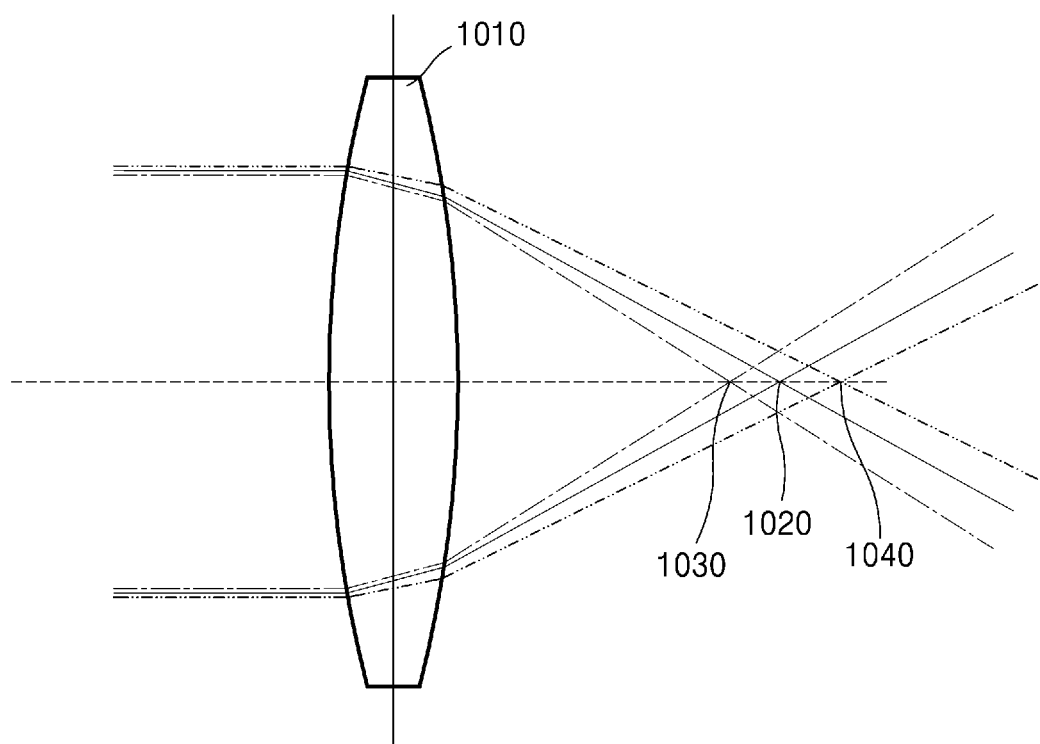
FIG. 10 is a diagram for explaining a method by which an image processing apparatus according to an embodiment corrects chromatic aberration for 360-degree image processing.

FIG. 10 is a diagram for explaining a method for correcting, by an image processing apparatus according to an embodiment, chromatic aberration for 360-degree image processing.

Referring to FIG. 10, it may be seen that, in the case where each of colors constituting a pixel is projected via an optical system 1010, an image is formed at different points since the colors have wavelength values different from each other. For example, in the case where a pixel is defined by red, green, and blue (RGB) components, with reference to a point 1020 where an image of the green component is formed, a point 1030 where an image of the blue component is formed may be located in the front, and a point 1040 where an image of the red component is formed may be located in the rear.

As described above with reference to FIG. 9B, in the case where the images to be projected onto the left and right eyes of the user have been determined, the image processing apparatus according to an embodiment may correct the RGB components included in each pixel of the determined left-eye and right-eye images, based on a chromatic aberration value. In this case, a back-propagation method may be applied based on parameters of the optical system to compensate for an occurrence of color aberration. That is, the image processing apparatus may pre-distort values of the R component and the B component such that the images of the R component and the B component may be formed at the point where the image of the G component is formed. In the present embodiment, the parameters of the optical system may include a refractive index, a focal length, a radius of curvature, and so forth of at least one lens constituting the optical system 1010.

Figure 11A:
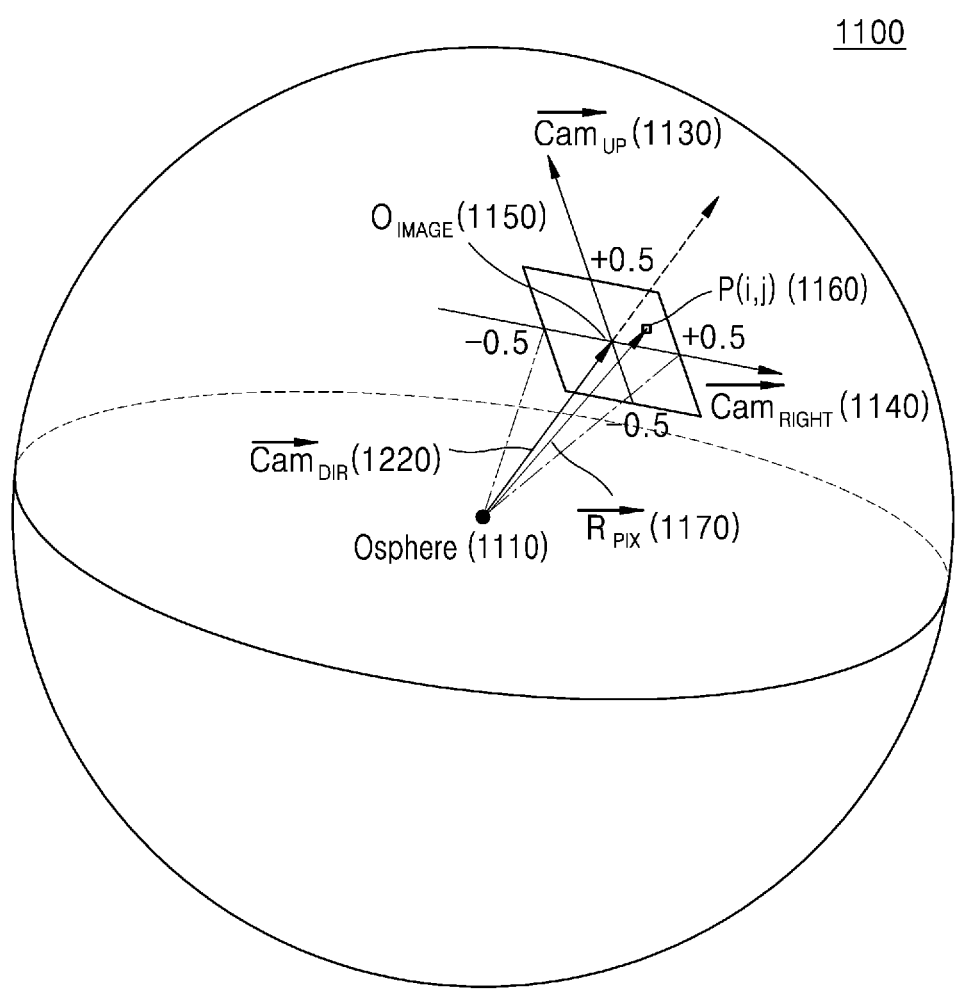
FIG. 11A is a diagram for explaining a method by which an image processing apparatus according to an embodiment determines a pixel vector of an image.

FIG. 11A is a diagram for explaining a method for determining, by an image processing apparatus according to an embodiment, a pixel vector of an image.

In FIG. 11A, it is assumed that, as described above with reference to FIG. 7, $\overrightarrow{Cam_{DIR}}$ 1120, $\overrightarrow{Cam_{up}}$ 1130, $\overrightarrow{Cam_{RIGH}}$ 1140, and $\overrightarrow{Img_{ORIG}}$ which is the image vector from a center 1110 of the sphere toward a center 1150 of the image, have been obtained based on the position information of the camera. $\overrightarrow{Cam_{DIR}}$ 1120, $\overrightarrow{Cam_{up}}$ 1130, $\overrightarrow{CCam_{RIGH}}$ 1140, and $\overrightarrow{Img_{ORIG}}$ of FIG. 11 may correspond to $\overrightarrow{Cam_{DIR}}$ 720, $\overrightarrow{Cam_{up}}$ 730, $\overrightarrow{Cam_{RIGH}}$ 740, and $\overrightarrow{Img_{ORIG}}$ of FIG. 7, respectively.

The image processing apparatus according to an embodiment may determine $\overrightarrow{R_{PIX}}$ 1170 which is a pixel vector of a pixel P 1160 located at, for example, coordinates (i, j) in an image, based on the following Equation 5.

$$\overrightarrow{R_{PIX}} = \overrightarrow{img_{ORIG}} + \overrightarrow{Cam_{up}} \cdot k_h + \overrightarrow{Cam_{RIGH}} k_w \qquad \text{[Equation 5]}$$

In Equation 5, $k_h$ and $k_w$ denote relative positions of the pixel in the image, and may be determined based on the following Equation 6.

$$k_h = \frac{i}{h} \qquad \text{[Equation 6]}$$
$$k_w = \frac{j}{w}$$

In Equation 6, w and h denote a width and a height of the image, respectively.

Meanwhile, in FIG. 11A, the pixel P 1160 targets a pixel for a blue color. Pixel vectors for a red color and a green color may be determined, in consideration of the chromatic aberration described above with reference to FIG. 10, based on positions of pixels in which the chromatic aberration has been corrected.

Figure 11B:
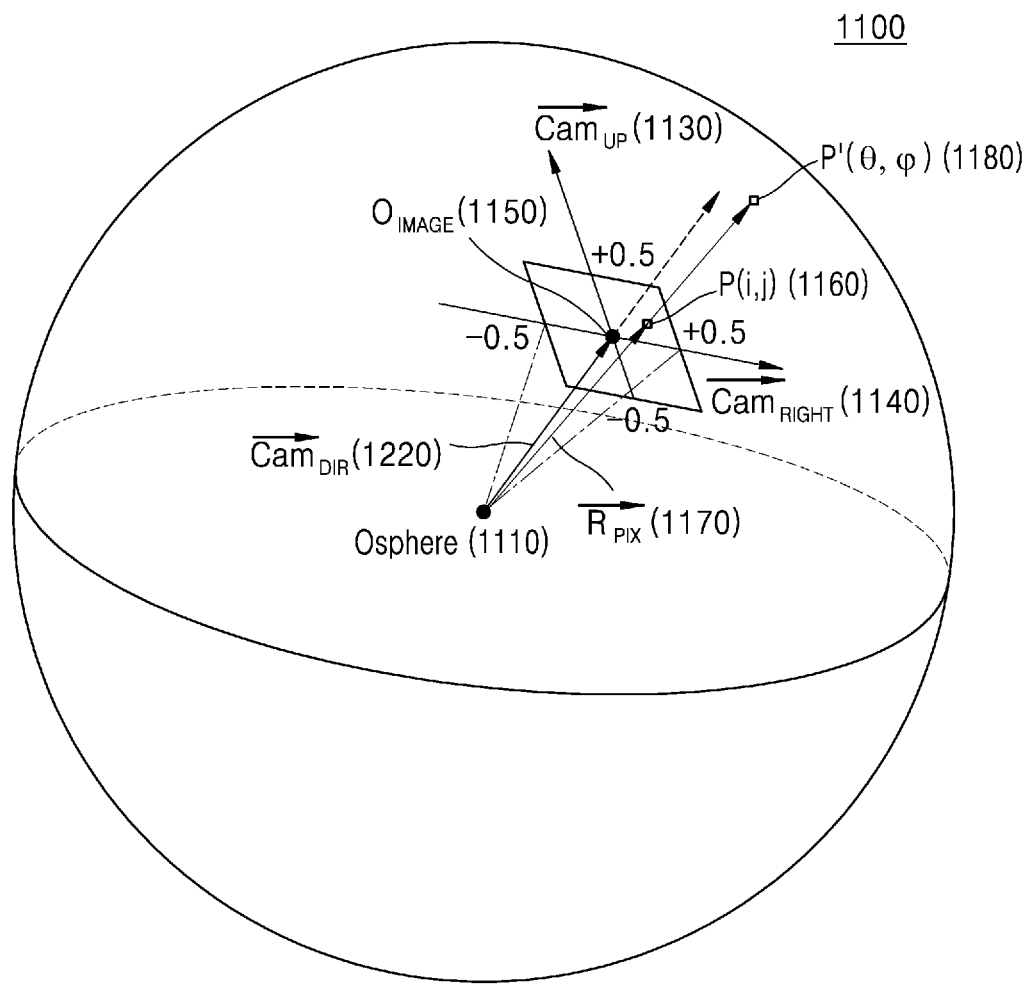
FIG. 11B is a diagram for explaining a method by which an image processing apparatus according to an embodiment determines a projection position in the case of projecting pixels of an image onto a sphere.

FIG. 11B is a diagram for explaining a method for determining, by an image processing apparatus according to an embodiment, a projection position in the case of projecting pixels of an image onto a sphere.

Referring to FIG. 11B, in the case where the pixel P 1160 is projected onto the sphere 1100 described with reference to FIG. 11A, the image processing apparatus according to an embodiment may determine P'(θ,φ) 1180 which is a projection position on the sphere 1100 based on the following Equation 7.

$$\theta = \text{acos}\left(\frac{y_R}{|\vec{R}_{PIX}|}\right) \cdot k_\theta, \phi = \text{atan}\left(\frac{z_R}{x_R}\right) \cdot k_\phi \qquad [\text{Equation 7}]$$

In Equation 7, $\vec{R}_{PIX}$ 1160 may correspond to the pixel vector described above with reference to FIG. 11A, and $x_R$, $y_R$, $z_R$ denote cartesian coordinates of $\vec{R}_{PIX}$ 1160. Further, in Equation 7, $k_\theta$, $k_\phi$ denote scale factors for transformation of an angular unit in radians into a pixel unit.

Figure 12A:
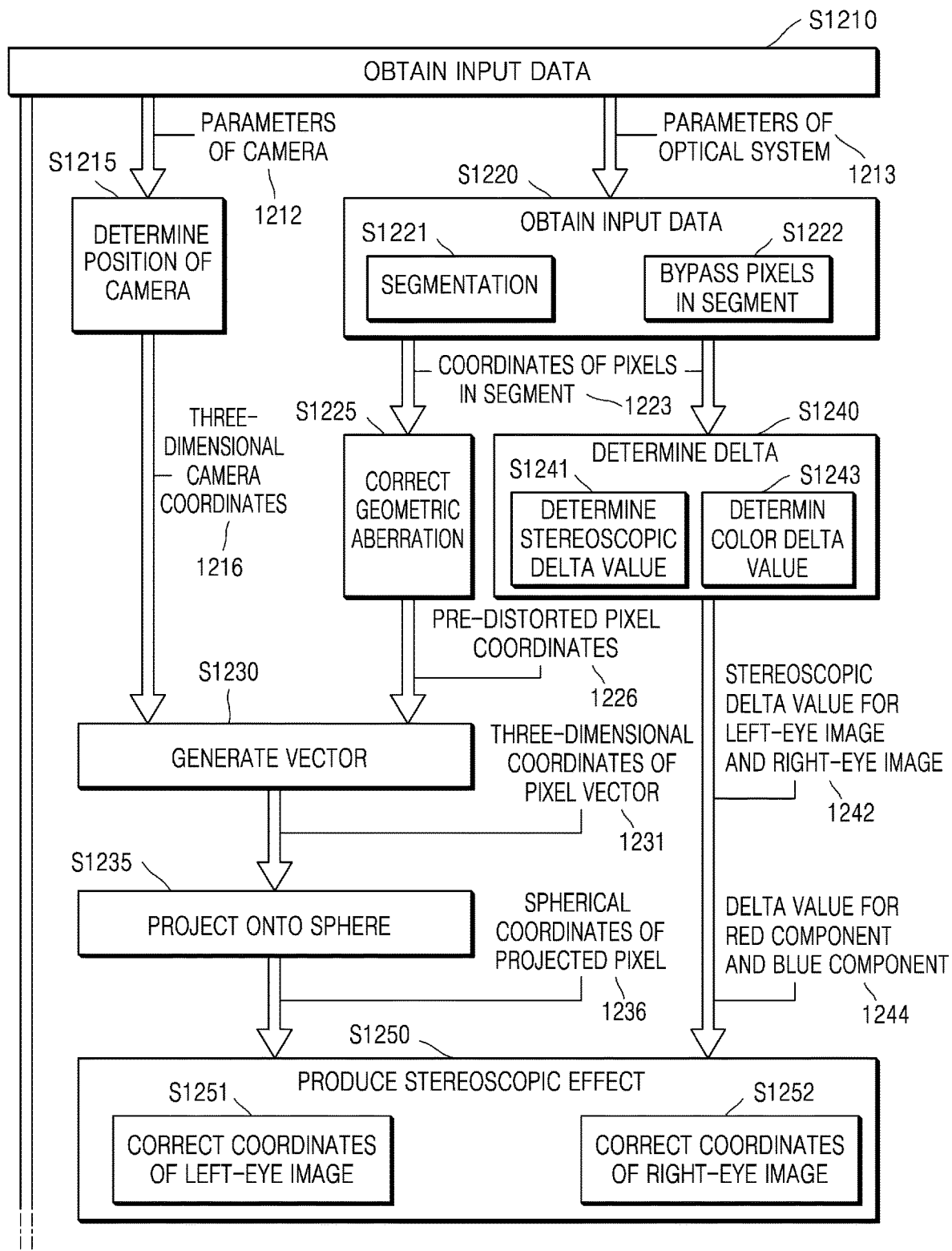
FIGS. 12A and 12B are flowcharts for more specifically explaining a method by which an image processing apparatus according to an embodiment processes a 360-degree image.
Figure 12B:
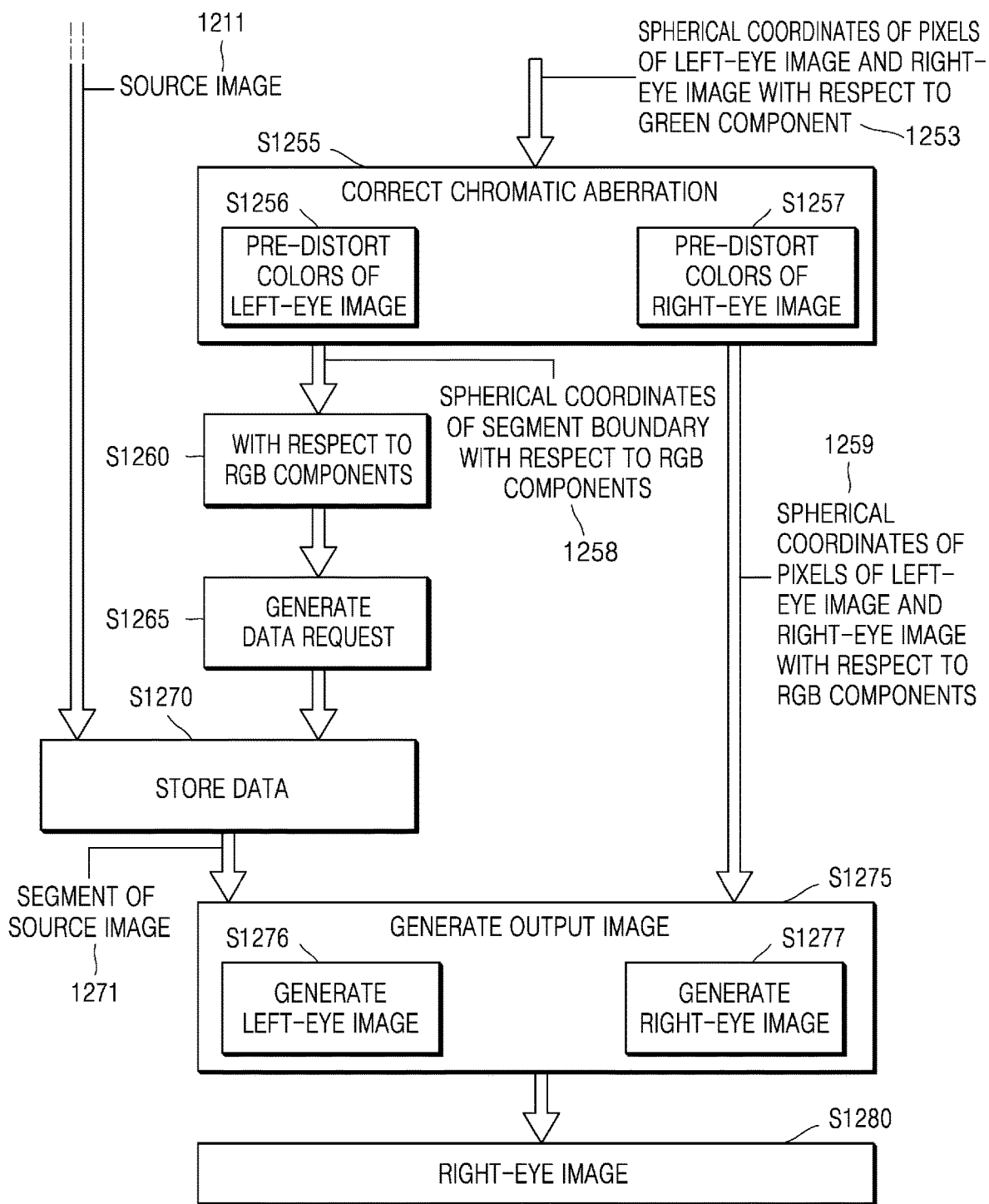

FIGS. 12A and 12B are flowcharts for more specifically explaining a method for processing, by an image processing apparatus according to an embodiment, a 360-degree image.

In operation S1210, the image processing apparatus may obtain input data. Here, the input data may include a source image 1211, a camera parameter 1212, and an optical system parameter 1213. The source image 1211 may be a 360-degree image. Also, the camera parameter 1212 may include position information of a camera, and the optical system parameter 1213 may include a refractive index, a focal length, a radius of curvature, and so forth of at least one lens constituting the optical system.

In operation S1215, the image processing apparatus may determine the position of the camera. Accordingly, the image processing apparatus may obtain three-dimensional camera coordinates 1216.

In operation S1220, the image processing apparatus may prepare an image.

The preparing of the image may include segmentation S1221 and bypassing pixels in a segment S1222.

In operation S1221, the image processing apparatus may perform the segmentation that divides a screen into a plurality of segments having a predefined size. When performing the segmentation, a segment processing order may be determined based on at least one of a position of the segment and the position of the camera, according to the nonlinearity of projection of a 360-degree image.

In operation S1222, the image processing apparatus may determine a bypassing order with respect to a plurality of pixels included in a segment. Here, the image processing apparatus may preferentially load a pixel located at a boundary point of a segment in order to minimize latency. Then, the image processing apparatus may bypass the pixels from a set top vertex along a predefined direction.

Meanwhile, as preparation of a screen of operation S1220 is being performed, coordinates 1223 of pixels in a segment may be obtained.

In operation S1225, the image processing apparatus may correct geometric aberration. The image processing apparatus may predict geometric aberration that may occur in the image based on the parameters of the optical system. Here, the geometric aberration may include, for example, a barrel distortion, a pincushion distortion and so forth.

The image processing apparatus according to an embodiment may pre-distort coordinates of a pixel in a reverse direction of the predicted geometric aberration. Accordingly, the image processing apparatus may obtain pre-distorted pixel coordinates 1226.

In operation S1230, the image processing apparatus may obtain a pixel vector in the image. Here, the pixel vector may be a vector from a center of a sphere onto which the image is projected, to the pre-distorted pixel coordinates 1226. Accordingly, the image processing apparatus may obtain three-dimensional coordinates 1231 of the pixel vector.

In operation S1235, the image processing apparatus may project the image onto the sphere.

In the case where an image is projected onto a sphere, the image processing apparatus according to an embodiment may obtain spherical coordinates representing a position of a pixel on the sphere. This may correspond to those described with reference to FIG. 11B. Accordingly, the image processing apparatus may obtain spherical coordinates 1236 of a projected pixel.

In operation S1240, the image processing apparatus may determine a delta value for the pixel. Here, the delta value may include at least one of a delta value for a stereoscopic effect and a delta value for correction of chromatic aberration.

For example, in operation S1241, the image processing apparatus may determine a stereoscopic delta value. The image processing apparatus according to an embodiment may generate a left-eye image and a right-eye image to be different from each other such that a user viewing the image may perceive stereoscopic depth. In this case, the left-eye image and the right-eye image may be generated by moving each of pixels included in the images according to the vision characteristics of a human being. The image processing apparatus may determine the stereoscopic delta value for moving pixels to generate a left-eye image and a right-eye image. The stereoscopic delta value 1242 for the left-eye image and the right-eye image may be provided in a form of a lookup table.

In addition, in operation S1243, the image processing apparatus may determine a color delta value. Different color components constituting each of the pixels included in the image may have focal lengths different from each other due to a difference between refractive indices in each wavelength, when passing through a lens of the optical system. The image processing apparatus may determine the color delta value to correct a point where focuses are formed at different positions for each color. In this case, in the case where a pixel is defined by red, green, and blue colors, the image processing apparatus may determine the delta value 1244 with respect to the red component and the blue component based on the green component.

In operation S1250, the image processing apparatus may produce a stereoscopic effect based on the spherical coordinates 1236 of the pixel and the stereoscopic delta value 1242 for the left-eye image and the right-eye image.

The producing of the stereoscopic effect may include correcting the coordinates of the left-eye image (S1251) and correcting the coordinates of the right-eye image (S1252). In operation S1251, the image processing apparatus may correct the spherical coordinates 1236 of the pixel based on the stereoscopic delta value for the left-eye image. In addition, in operation S1252, the image processing apparatus may correct the spherical coordinates 1236 of the pixel based on the stereoscopic delta value for the right-eye image.

The image processing apparatus may obtain spherical coordinates 1253 of pixels of the left-eye image and the right-eye image with respect to the green component, as a result of producing the stereoscopic effect.

In operation S1255, the image processing apparatus may correct chromatic aberration based on the spherical coordinates 1253 of the pixels of the left-eye image and the right-eye image with respect to the green component.

The correcting of the chromatic aberration may include pre-distorting colors of the left-eye image (S1256) and pre-distorting colors of the right-eye image (S1257).

In operation S1256, the image processing apparatus may correct the spherical coordinates of the pixels of the left-eye image for the green component based on the delta value for the blue component and the red component. In this case, the back-propagation method described above with reference to FIG. 10 may be used.

In operation S1257, the image processing apparatus may correct the spherical coordinates of the pixels of the right-eye image for the green component based on the delta value for the blue component and the red component.

In operation S1260, the image processing apparatus may analyze a segment boundary based on spherical coordinates 1258 of a segment boundary with respect to RGB colors obtained by performing chromatic aberration correction.

In operation S1265, the image processing apparatus may generate a data request. In order to reduce latency, in the generating of the data request, the image processing apparatus may preferentially generate an order of a data request for a pixel located at the segment boundary. In addition, the image processing apparatus may determine a data request order based on the position of the segment, the position of the camera, and so forth.

In operation S1270, the image processing apparatus may store data obtained from the source image 1211 in response to a data request.

In operation S1275, the image processing apparatus may generate an output image based on a segment 1271 of the source image and spherical coordinates 1259 of the pixels of the left-eye image and the right-eye image with respect to the RGB colors.

The generating of the output image by the image processing apparatus may include generating the left-eye image (S1276) and generating the right-eye image (S1277).

In operation S1280, the image processing apparatus may output the generated image.

Meanwhile, although the operations described above with reference to FIG. 12 were described in time series for convenience of description, the order in which the operations are performed is not limited to the example described above.

Figure 13:
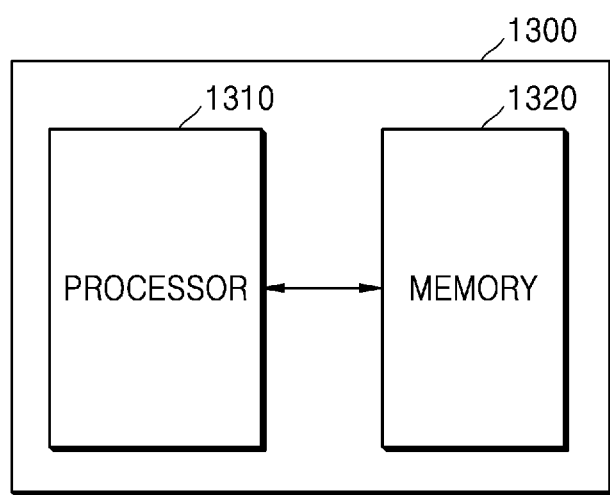
FIGS. 13 and 14 are block diagrams of an image processing apparatus according to an embodiment.
Figure 14:
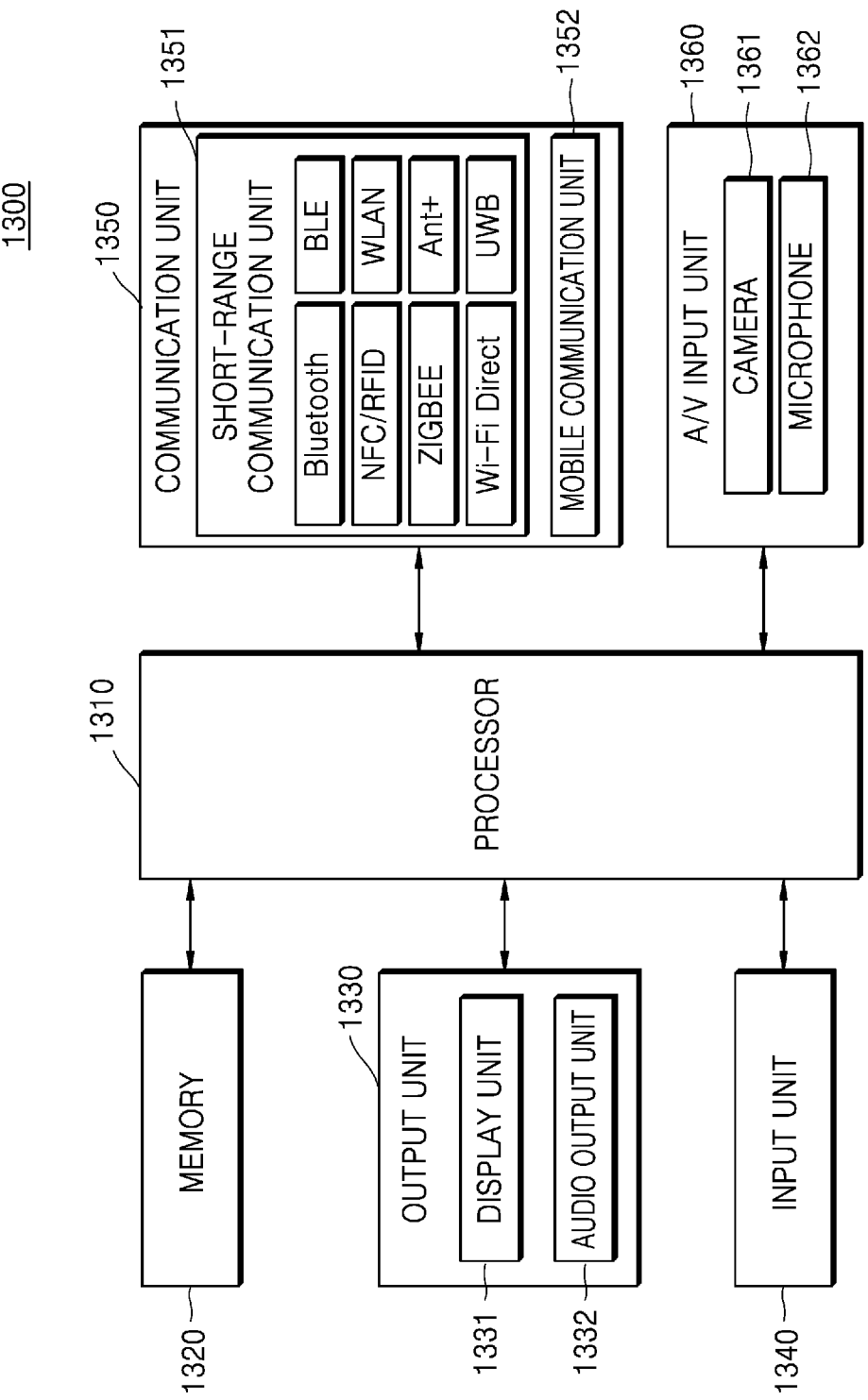

FIGS. 13 and 14 are block diagrams of an image processing apparatus 1300 according to an embodiment.

As illustrated in FIG. 13, the image processing apparatus 1300 may include a processor 1310 and a memory 1320. However, not all illustrated elements are indispensable elements. The image processing apparatus 1300 may be implemented with more elements than the illustrated elements, or the image processing apparatus 1300 may be implemented with fewer elements than the illustrated elements.

For example, the image processing apparatus 1300 may further include an output unit 1330, an input unit 1340, a communication unit 1350, and an A/V input unit 1360 in addition to the processor 1310 and the memory 1320.

Hereinafter, the elements will be described in detail.

The processor 1310 generally controls an overall operation of the image processing apparatus 1300 and a signal flow between internal components of the image processing apparatus 1300, and processes data. For example, the processor 1310 may control the output unit 1330, the input unit 1340, the communication unit 1350, and the AN input unit 1360 overall by executing programs (one or more instructions) stored in the memory 1320.

The processor 1320 according to an embodiment may determine a processing order of each of a plurality of segments constituting a 360-degree image based on a position of each segment and parameters of a camera by which the 360-degree image is captured. In addition, the processor 1320 may obtain distortion correction information based on a distortion in the 360-degree image predicted from parameters of an optical device via which at least a partial region of the 360-degree image is projected. The processor 1320 may process data of the at least a partial region of the 360-degree image according to the determined processing order and the obtained distortion correction information.

The memory 1320 may store programs (for example, one or more instructions and a learning network model) for processing and controlling the processor 1310, and may store data (for example, additional information) input to the image processing apparatus 1300 or output from the image processing apparatus 1300.

The output unit 1330 may output information on the at least a partial region of the image 360 processed by the processor 1310 in a form of an audio signal or a video signal, and the output unit 1330 may include a display unit 1331 and an audio output unit 1332.

The display unit 1331 may display information processed by the image processing apparatus 1300. In the case where the display unit 1331 and a touch pad form a layer structure to constitute a touch screen, the display unit 1331 may be used as an input device as well as an output device.

The audio output unit 1332 may output audio data received from the communication unit 1350 or stored in the memory 1320. The audio output unit 1332 may output sound data corresponding to the at least a partial region of the 360-degree image.

The input unit 1340 may be a means by which a user inputs data for controlling the image processing apparatus 1300. For example, the input unit 1340 may include, but is not limited to, a key pad, a dome switch, a touch pad (a contact capacitive type touch pad, a pressure resistive type touch pad, an infrared sensing type touch pad, a surface acoustic wave type touch pad, an integral strain gauge type touch pad, a piezo effect type touch pad, etc.), a jog wheel, a jog switch, and so forth.

The communication unit 1350 according to an embodiment may receive a 360-degree image captured by a capturing apparatus such as a camera.

In addition, the communication unit 1350 may include one or more elements that enable communications with an external server and other external devices (for example, an object). For example, the communication unit 1350 may include a short-range wireless communication unit 1351 and a mobile communication unit 1352.

The short-range wireless communication unit 1351 may include, but is not limited to, a Bluetooth communication unit, a Bluetooth Low Energy (BLE) communication unit, a near field communication (NFC)/radio-frequency identification (RFID) communication unit, a WLAN (Wi-Fi) communication unit, a Zigbee communication unit, an infrared data association (IrDA) communication unit, a WFD (Wi-Fi Direct) communication unit, an ultra wideband (UWB) communication unit, an Ant+ communication unit, and so forth.

The mobile communication unit 1352 may transmit and receive a wireless signal to and from at least one of a base station, an external terminal, and a server over a mobile communication network.

The AN (Audio/Video) input unit 1360 is to input an audio signal or a video signal and may include a camera 1361, a microphone 1362, and so forth.

The camera 1361 may capture a 360-degree image within a camera recognition range. According to an embodiment, a 360-degree image captured by the camera 1361 may be processed by the processor 1310 and displayed via the display unit 1331.

The microphone 1362 may receive a user's voice input related to processing of a 360-degree image.

The method according to an embodiment of the present disclosure may be implemented in the form of a program instruction that may be executed by various computer means and may be recorded in a computer-readable medium. The computer-readable medium may include a program instruction, a data file, a data structure or the like, alone or in combination. The program instruction to be recorded in the medium may be specially designed and configured for the present disclosure or may be known to those of ordinary skill in computer software. Examples of the computer-readable medium include magnetic media such as a hard disk, a floppy disk, and a magnetic tape, optical media such as a CD-ROM and a DVD, magneto-optical media such as a floptical disk, and hardware devices specially configured to store and perform program instructions such as a ROM, a RAM, a flash memory, and so forth. Examples of the program instruction include machine code, such as that produced by a compiler, and high-level language code that may be executed by a computer using an interpreter.

The apparatus according to an embodiment may include a processor, a memory for storing and executing program data, a permanent storage such as a disk drive, a communication port for communications with external devices, and user interface devices such as a touch panel, keys, buttons, and so forth. Methods implemented with software modules or algorithms may be stored on a computer-readable recording medium, as computer-readable code or program instructions executable on the processor. Examples of the computer-readable recording medium include magnetic storage media (for example, read-only memory (ROM), random-access memory (RAM), floppy disks, hard disks, and so forth), optical recording media (for example, CD-ROMs, digital versatile disks (DVDs)), and so forth. The computer-readable recording medium may be distributed over network-coupled computer systems such that computer-readable code may be stored and executed in a distributed fashion. The medium may be read by a computer, stored in a memory, and executed by a processor.

In the embodiments illustrated in the drawings, reference numerals are used, and specific terms are used to describe the embodiments, but the present disclosure is not limited to a specific term, and the embodiments may include all components that may be generally considered by those of ordinary skill in the art.

The embodiments may be described in terms of functional block components and various processing operations. Such functional blocks may be implemented with a variety of hardware and/or software configurations for executing specific functions. For example, the embodiments may employ various integrated circuit components, such as memory, processing, logics, look-up tables, and so forth, which may carry out a variety of functions under the control of one or more microprocessors or by other control devices. In addition, the embodiments may employ the same kind or different kinds of cores or different kinds of CPUs. Similarly, where the elements of the present disclosure may be implemented using software programming or software elements, the embodiments may be implemented with a programming or scripting language such as C, C++, Java, assembler, or the like, with various algorithms implemented with any combination of data structures, processes, routines or other programming elements. Functional aspects may be implemented with algorithms executable in one or more processors. In addition, the embodiments may employ conventional technologies for electronic environment setting, signal processing, and/or data processing. The terms "mechanism", "element", "means", and "configuration" may be widely used and are not limited to mechanical and physical configurations. The terms may include the meaning of a series of routines of software in conjunction with a processor or the like.

The specific implementations described in the embodiments are only examples, and the scopes of the embodiments are not limited by any method. For the simplicity of the present specification, conventional electronic configurations, control systems, software, and descriptions of other functional aspects of the systems may be omitted. In addition, the connections or connection members of the lines between the elements illustrated in the drawings are exemplarily illustrative of functional connections and/or physical or circuit connections, and may be alternatively or additionally represented as various functional connections, physical connections, or circuit connections in actual devices. In addition, unless specified, such as "essential" or "important", the elements may not be necessary for the application of the present disclosure.

In the specification (in particular, claims) of the embodiment, the use of the term "the" and its similar indicative terms may correspond to both singular and plural. In addition, when a range is stated in the embodiments, it covers the disclosure where an individual value included in that range is applied (unless stated otherwise), and such statement is equivalent to statement of each individual value forming the range in the detailed description of the present disclosure. Finally, unless the order of operations forming the method according to an embodiment is explicitly stated or stated otherwise, those operations may be performed in any appropriate order. The stated order of the operations does not necessarily limit the embodiments. The use of any example or exemplary term (for example, "and so forth") is merely intended to describe the embodiments in detail, and thus unless defined by the claims, the scopes of the embodiments are not limited by the examples or exemplary term. In addition, it can be understood by those of ordinary skill in the art that various modifications, combinations, and changes can be made according to design conditions and factors within the scope of claims and equivalents thereof.

The invention claimed is:

1. A method for processing a 360-degree image, the method comprising:
   determining a processing order of each of a plurality of segments constituting a 360-degree image, based on positions of the plurality of segments and parameters of a camera by which the 360-degree image is captured;

obtaining distortion correction information according to distortion in the 360-degree image predicted based on parameters of an optical device via which at least a partial region of the 360-degree image is projected; and processing data of the at least the partial region of the 360-degree image according to the determined processing order and the obtained distortion correction information, and wherein the determining of the processing order comprises determining the processing order to allow a pixel in a boundary region to be processed in preference to other pixels, the pixel being from among pixels included in each of the plurality of segments.

2. The method of claim 1, wherein the determining of the processing order comprises:

dividing the 360-degree image into the plurality of segments; and determining the processing order based on a position of the divided segments in a quadrant and a pitch value of the camera.

3. The method of claim 1, wherein the obtaining of the distortion correction information comprises predicting at least one of barrel distortion and pincushion distortion based on the parameters of the optical device, and the distortion correction information comprises pixel correction information capable of offsetting at least one of the barrel distortion and the pincushion distortion.

4. The method of claim 1, further comprising determining a coordinate transformation value of a pixel included in the at least the partial region of the 360-degree image according to predefined transformation information of left-eye and right-eye images.

5. The method of claim 1, wherein the obtaining of the distortion correction information comprises predicting chromatic aberration of a pixel included in the 360-degree image based on the parameters of the optical device, and the distortion correction information comprises pixel correction information for each color capable of offsetting the predicted chromatic aberration.

6. The method of claim 1, further comprising determining coordinates, on a sphere, of a pixel included in the at least the partial region of the 360-degree image, based on the parameters of the camera, and the processing of the data comprises processing the determined coordinates according to the determined processing order and the obtained distortion information.

7. An apparatus for processing a 360-degree image, the apparatus comprising:

a memory storing one or more instructions; and at least one processor configured to execute the one or more instructions stored in the memory, wherein the at least one processor is configured to, by executing the one or more instructions, determine a processing order of each of a plurality of segments constituting a 360-degree image, based on positions of the plurality of segments and parameters of a camera by which the 360-degree image is captured, obtain distortion correction information based on distortion in the 360-degree image predicted from parameters of an optical device via which at least a partial region of the 360-degree image is projected, and process data of the at least the partial region of the 360-degree image according to the determined processing order and the obtained distortion correction information, and wherein the at least one processor is further configured to determine the processing order such that, among pixels included in each of the plurality of segments, a pixel in a boundary region is processed in preference to other pixels.

8. The apparatus of claim 7, wherein the at least one processor is configured to, by executing the one or more instructions, divide the 360-degree image into the plurality of segments, and determine the processing order based on a position of the divided segments in a quadrant and a pitch value of the camera.

9. The apparatus of claim 7, wherein the at least one processor is configured to, by executing the one or more instructions, predict at least one of barrel distortion and pincushion distortion based on the parameters of the optical device, and the distortion correction information comprises pixel correction information capable of offsetting at least one of the barrel distortion and the pincushion distortion.

10. The apparatus of claim 7, wherein the at least one processor is configured to, by executing the one or more instructions, determine a coordinate transformation value of a pixel included in the at least the partial region of the 360-degree image according to predefined transformation information of left-eye and right-eye images.

11. The apparatus of claim 7, wherein the at least one processor is configured to, by executing the one or more instructions, predict chromatic aberration of a pixel included in the 360-degree image based on the parameters of the optical device, and the distortion correction information comprises pixel correction information for each color capable of offsetting the predicted chromatic aberration.

12. The apparatus of claim 7, wherein the at least one processor is configured to, by executing the one or more instructions, determine coordinates, on a sphere, of a pixel included in the at least the partial region of the 360-degree image, based on the parameters of the camera, and process the determined coordinates according to the determined processing order and the obtained distortion information.

13. A computer program product comprising a non-transitory computable-readable recording medium storing a program for:

determining a processing order of each of a plurality of segments constituting a 360-degree image, based on positions of the plurality of segments and parameters of a camera by which the 360-degree image is captured;

obtaining distortion correction information according to distortion in the 360-degree image predicted based on parameters of an optical device via which at least a partial region of the 360-degree image is projected; and processing data of the at least the partial region of the 360-degree image according to the determined processing order and the obtained distortion correction information, and wherein the determining of the processing order comprises determining the processing order to allow a pixel in a boundary region to be processed in preference to other pixels, the pixel being from among pixels included in each of the plurality of segments.

* * * * *